United States Patent
Moro et al.

(10) Patent No.: US 6,774,510 B1
(45) Date of Patent: Aug. 10, 2004

(54) ELECTROMAGNETIC MOTOR WITH FLUX STABILIZATION RING, SATURATION TIPS, AND RADIATOR

(75) Inventors: Jerry Moro, Moorpark, CA (US); Douglas J. Button, Simi Valley, CA (US)

(73) Assignee: Harman International Industries, Inc., Northridge, CA (US)

( * ) Notice: Subject to any disclaimer, the term of this patent is extended or adjusted under 35 U.S.C. 154(b) by 64 days.

(21) Appl. No.: 09/696,392

(22) Filed: Oct. 25, 2000

(51) Int. Cl.$^7$ .......................... H04R 9/00; H02K 41/00
(52) U.S. Cl. ...................... 310/12; 381/400; 381/414; 381/429
(58) Field of Search ................ 381/396, 412, 381/414, 400, 422, 420, 421; 310/12–15, 17, 190, 193

(56) References Cited

U.S. PATENT DOCUMENTS

| | | | |
|---|---|---|---|
| 3,024,374 A | * 3/1962 | Stauder ...................... 310/15 |
| 3,055,991 A | 9/1962 | Guss .......................... 381/401 |
| 3,116,377 A | 12/1963 | Todt ........................... 381/407 |
| 3,127,749 A | 4/1964 | Bergvall et al. .............. 62/312 |
| 3,296,472 A | * 1/1967 | Fisher ........................ 310/186 |
| 3,783,311 A | 1/1974 | Sato et al. ................... 310/27 |
| 3,830,986 A | 8/1974 | Yamamuro ................. 381/414 |
| 3,881,074 A | 4/1975 | Kawamura ............... 179/115.5 |
| 3,891,874 A | * 6/1975 | Roters et al. ................ 310/14 |
| 3,937,905 A | 2/1976 | Manger ...................... 381/421 |
| 4,023,056 A | * 5/1977 | Yamada et al. ............... 310/15 |
| 4,160,133 A | 7/1979 | Wiik .......................... 381/401 |
| 4,220,832 A | * 9/1980 | Nagel ........................ 381/186 |
| 4,227,100 A | * 10/1980 | Ezekiel et al. ................ 310/13 |

(List continued on next page.)

FOREIGN PATENT DOCUMENTS

| | | | |
|---|---|---|---|
| AU | 542761 | 2/1985 | |
| BG | 62505 B2 | 12/1999 | |
| EP | 91310414.7 | 11/1991 | |
| FR | 1.180.456 | 12/1958 | |
| JP | 60018107 | 2/1985 | |
| JP | 404335799 A | * 11/1992 | ............ H04R/9/02 |
| JP | 05013824 | 1/1993 | |
| JP | 06-233380 A | * 8/1994 | |
| WO | PCT/US99/06084 | 3/1999 | |

OTHER PUBLICATIONS webpages from www.hitachimetals.com/products/mag/neodymium.html and from www.hitachimetals.com/products/mag/neodymium/properties.html, downloaded Sep. 2002.*

(List continued on next page.)

Primary Examiner—Thanh Lam
Assistant Examiner—Judson H. Jones
(74) Attorney, Agent, or Firm—Squire, Sanders & Dempsey, L.L.P.

(57) ABSTRACT

The present invention provides an electromagnetic drive motor assembly (EDMA) that has an inner flux return assembly formed from an upper pole piece and a lower pole piece oppositely disposed relative to each other along the center of the EDMA. An annularly positioned conductive ring (or flux stabilization ring) encircles the inner flux return assembly, concentrically in contact with the outside of the inner flux return assembly. Along the exterior side of the flux return pieces, is a magnet that is between a top plate and a bottom plate. Each plate contacts with the magnet to form a magnetically conductive system. A magnetic gap is formed in between the inner flux return assembly and the top and bottom plates. Disposed within the magnetic gap is a dual coil wound around a cylinder. The dual coil includes a first coil portion and a second coil portion. To minimize the modulation, the top and bottom plates may be saturated and plate tips may be provided near the magnetic gap. And to dissipate heat away from the magnetic gap, a thermal radiating conductive ring may be provided as well.

56 Claims, 16 Drawing Sheets

U.S. PATENT DOCUMENTS

| | | | |
|---|---|---|---|
| 4,289,937 A | | 9/1981 | Ikeda et al. ............... 381/414 |
| 4,295,011 A | * | 10/1981 | Hathaway ................. 381/414 |
| 4,301,887 A | * | 11/1981 | Fiske, Jr. .................. 181/107 |
| 4,439,700 A | * | 3/1984 | Menzel et al. .............. 310/13 |
| 4,580,015 A | * | 4/1986 | O'Neill ..................... 381/396 |
| 4,584,495 A | * | 4/1986 | Kordik ..................... 310/49 R |
| 4,595,801 A | | 6/1986 | Coffin ..................... 179/115.5 |
| 4,598,178 A | * | 7/1986 | Rollins ..................... 381/354 |
| 4,612,592 A | | 9/1986 | Frandsen ................. 360/266.9 |
| 4,702,090 A | * | 10/1987 | Barclay et al. ............. 62/3.3 |
| 4,914,707 A | | 4/1990 | Kato et al. ................. 381/401 |
| 4,933,975 A | | 6/1990 | Button ..................... 381/97 |
| 4,980,921 A | * | 12/1990 | Zwicky ..................... 381/414 |
| 5,070,158 A | | 12/1991 | Holloway et al. .......... 525/475 |
| 5,207,410 A | * | 5/1993 | Wakeman ............... 251/129.15 |
| 5,304,883 A | * | 4/1994 | Denk ....................... 310/180 |
| 5,357,587 A | * | 10/1994 | Grodinsky et al. ........ 381/414 |
| 5,371,806 A | | 12/1994 | Kohara et al. ............. 381/420 |
| 5,422,432 A | * | 6/1995 | Lace ......................... 84/726 |
| 5,440,183 A | * | 8/1995 | Denne ..................... 310/12 |
| 5,590,210 A | * | 12/1996 | Matsuo et al. ............. 381/412 |
| 5,677,963 A | * | 10/1997 | Morcos et al. ............. 381/412 |
| 5,717,262 A | | 2/1998 | Muller et al. .............. 310/60 A |
| 5,748,760 A | | 5/1998 | Button ..................... 381/412 |
| 5,815,587 A | | 9/1998 | Goller ..................... 381/412 |
| 5,828,767 A | | 10/1998 | Button ..................... 381/86 |
| 5,909,015 A | * | 6/1999 | Yamamoto et al. ........ 181/156 |
| 6,043,978 A | * | 3/2000 | Mody et al. ................ 361/690 |
| 6,111,972 A | | 8/2000 | Rigondeau ................ 381/431 |
| 6,225,713 B1 | * | 5/2001 | Hattori et al. .............. 310/15 |
| 6,483,207 B1 | * | 11/2002 | Redlich ..................... 310/12 |

OTHER PUBLICATIONS

"Moving–Coil Loudspeaker Topology As An Indicator Of Linear Capability" by Mark R. Gander, James B. Lansing Sound, Inc., Northridge, CA, An AES Preprint, Presented at the 64th Convention Nov. 2 through 5, 1979, New York City, USA, published by J. Audio Eng. Society.

"Design Parameters and Trade–Offs in Large Diameter Transducers" by Douglas J. Button, JBL/Harman Speaker Manufacturing, Northridge, CA 91329, USA, An AES Preprint, Presented at the 91st Convention 1991 Oct. 4–8, New York, USA, published by J. Audio Eng. Society.

"Analysis of Harmonic Distortion in Electroacoustic Transducers" by Charles H. Sherman and John L. Butler, Image Acoustics, Inc., J. Acoust. Soc. Am. 98 (3), Sep. 1995, pp. 1596–1611, published May 2, 1995.

Paper "Magnetic Circuit Design Methodologies for Dual Coil Transducers" by Douglas J. Button, JBL Professional, Northridge, CA, USA, pp. 1–15 with Figures 1–38, Acknowledgments and References Jun. 2002.

Paper "The Dual Coil Drive Loudspeaker" by Douglas J. Button, JBL Professional, Northridge, CA, USA, Paper with Figures 1–48, Acknowledgments and References, date unknown.

* cited by examiner

_US 6,774,510 B1_

ELECTROMAGNETIC MOTOR WITH FLUX STABILIZATION RING, SATURATION TIPS, AND RADIATOR

BACKGROUND OF THE INVENTION

1. Field of the Invention

This invention relates generally to an electromagnetic drive motor assembly (EDMA). More particularly, the invention relates to a design of an EDMA that has dual coils positioned within a magnetic gap formed by a flux return assembly inside and an outside assembly of top and bottom plates sandwiching a permanent magnetic material. Enclosing the flux return assembly is a flux stabilization ring.

2. Description of the Related Art

Dual coil, dual gap electromagnetic motors or transducers have existed for many years, and recently they have been used more widely in the field of speaker design. Typically, an electromagnetic motor uses magnets to produce magnetic flux in an air gap. These magnets are typically permanent magnets, used in a magnetic circuit of ferromagnetic material to direct most of the flux produced by the permanent magnet through the components of the motor and into the air gap.

In one prior art transducer, a coil is placed in an air gap with its conductors wound cylindrically so as to be placed perpendicular to the magnet generating the magnetic flux in the air gap. The coil is normally connected to an audio amplifier of some type that produces a current in the coil that is a function of the electrical signal to be transformed by the loudspeaker into an audible, sub-audible or ultrasonic pressure variation. The coil is normally disposed to carry a current in a direction that is substantially perpendicular to the direction of the lines of magnetic flux produced by the magnet. The magnetic structure is often arranged to provide cylindrical symmetry with an annular air gap in which the magnet flux lines are directed radially with respect to the axis of cylindrical symmetry of the loudspeaker.

Other conventional electromagnetic loudspeakers employ a diaphragm that is vibrated by an electromechanical drive. The drive generally comprises a magnet and a voice coil with an electrical signal passed through the voice coil. The interaction between the current passing through the voice coil and the magnetic field produced by the permanent magnet causes the voice coil to oscillate in accordance with the electrical signal and, in turn, drives the diaphragm and produces sound.

One common problem associated with electromagnetic transducers is the generation and dissipation of heat. As current passes through the dual coils, the resistance of the components generates heat. The tolerance of the various internal components is limited by the thermal breakdown of those various components. If the internal components become too hot, the adhesives used to contact the components together, or the components themselves, will melt, resulting in a breakdown in the operation of the speaker. Since the resistance of the voice coil comprises a major portion of a driver's impedance, most of the input power is converted into heat rather than sound. Thus, the power handling capacity of a motor is limited by its ability to tolerate heat.

Another problem associated with heat is temperature-induced resistance, commonly referred to as power compression. As the temperature of the motor voice coil increases, the resistance of conductors or wires used in the motor also increases. At higher temperatures, power input is converted mostly into additional heat rather than sound, thereby seriously limiting motor efficiency. When subjected to heat, the performance of some magnetic material can also be effected.

Another, problem is that the magnet in the transducer creates a static magnetic field, and this static field can be modulated by the changing magnetic field in the coil generated by the current in the voice coil. This phenomenon has been discussed by W. J. Cunningham, an article entitled "Non-Linear Distortion in Dynamic Loudspeakers due to Magnetic Effects," J. Acoust. Soc. Am., Vol. 21, pp 207–207 (1949 May); and J. R. Gilliom, entitled "Distortion in Dynamic Loudspeakers due to Modulation of the Permanent Field." presented at the $42^{nd}$ Convention of the Audio Engineering Society, Los Angeles, Calif., 1972 May 2–5. Both of these references are hereby incorporated by reference into this application.

That is, as current is passed through the dual coils, the dual coils move within the static magnetic field. At the same time, the current passing through the dual coils also creates a magnetic field around the wire, as a result, the magnetic field around the wire moves within the static magnetic field of the magnet, thus modulating it. The amount of modulation is substantially related to the number of turns in the coil and current being applied, or the total Amp-tuns. Modulation of the static field can also be viewed as a "global" modulation effect that is asymmetrical and in turn generates second harmonic distortion. Depending on the saturation level of the steel surrounding the magnetic gap, the moving field of the voice coil also creates a "local" modulation effect of the magnetic field within the steel surrounding the magnetic gaps so that symmetrical or third harmonic distortion is created in the output signal. Therefore, electromagnetic transducers must also be designed with the reduction of signal distortion in mind as well as heat dissipation.

Still another problem with the electromagnetic transducer is that air is often trapped underneath the dome or diaphragm so that as the dome moves up and down, the air is pressurized to resist the movement of the dome. Such resistance generates extraneous air noise, and is symmetrical in nature so that third harmonic distortion is generated.

Yet another problem is modulation within the magnetic gap. This is largely due to weak magnetic flux running through the steel that creates the magnetic gap and this causes third harmonic distortion due to a symmetrical phenomenon. And as discussed above this creates a "local" modulation effect.

Accordingly, there still is a need for an electromagnetic motor that maximizes output power; dissipates heat well; minimize distortion; minimize modulation; and reduce air noise.

SUMMARY OF THE INVENTION

The present invention satisfies the above needs by providing an electromagnetic drive motor assembly (EDMA) that has an inner flux return assembly formed from an upper pole piece and a lower pole piece oppositely disposed relative to each other along the center of the EDMA. An annularly positioned conductive ring (or flux stabilization ring) encircles the inner flux return assembly, concentrically in contact with the outside of the inner flux return assembly. Along the exterior side of the flux return pieces, is a magnet that is between a top plate and a bottom plate. Each plate contacts with the magnet to form a magnetically conductive system. A magnetic gap is formed in between the inner flux return assembly and the top and bottom plates. Disposed within the magnetic gap is a dual coil wound around a cylinder. The dual coil includes a first coil portion and a second coil portion.

The top and bottom plates and the inner flux return assembly may be made of ferromagnetic material, such as steel, and may be designed to operate within the magnetic saturation region near the magnetic gap but below the magnetic saturation region throughout the other areas; but at the same time, they are optimized to minimize weight. The magnetic saturation near the magnetic gap reduces flux modulation in the ferromagnetic material directly adjacent to the coil thus minimizing distortion. On the other hand, there is a trade off between low distortion and higher output energy when comparing designs of the same weight of permanent magnetic material. Put differently, to design a "cost efficient" magnetic structure, the structure may be designed to use minimal steel as possible before the steel saturates to a point where there is loss of flux level in the magnetic gap. With such design, the inner flux return assembly, for example, may be designed with a hole along its center so that air within the cylinder is allowed to move in and out freely and not resist the movement of the woofer. This also reduces the air noise in the transducer generated by the resistance.

The flux stabilization ring, or conductive ring, performs multiple functions: (1) it concentrically holds the upper and lower pole pieces together, this reduces manufacturing cost and time; (2) draws heat away from the magnetic gap due to its proximity to the voice coils; and (3) substantially stabilizes the modulation effect caused by the magnetic fields around the voice coil moving within the static magnetic field from the magnet.

To efficiently transfer heat away from the magnetic gap, a thermal radiating conductive ring may be provided with an inner ring juxtaposed to the magnetic gap, an outer ring near the atmosphere, and a bridge between the inner and outer rings and running through the magnets. This way, the heat within the magnetic gap area can be more directly transferred from the inner ring and to the outer ring.

The top and bottom plates each may have an extended plate tip, or thin area of steel, to force magnetic saturation of the material adjacent to the voice coils. Again, the magnetic saturation of the plate and/or plate tips reduces the flux modulation in the steel directly adjacent to the coil thus minimizing distortion.

The above described and many other features and attendant advantages of the present invention will become apparent from a consideration of the following detailed description when considered in conjunction with the accompanying drawings.

BRIEF DESCRIPTION OF THE DRAWINGS

Detailed description of the embodiment for the invention will be made with reference to the accompanying drawings.

FIG. 8D is an broad cross-sectional view of the TRCR according to. FIG. 8A along the line 8C—8C in FIG. 8A;

DETAILED DESCRIPTION OF THE EMBODIMENTS

This description is not to be taken in a limiting sense, but is made merely for the purpose of illustrating the general principles of the invention. The section titles and overall organization of the present detailed description are for the purpose of convenience only and are not intended to limit the present invention.

Figure 1:
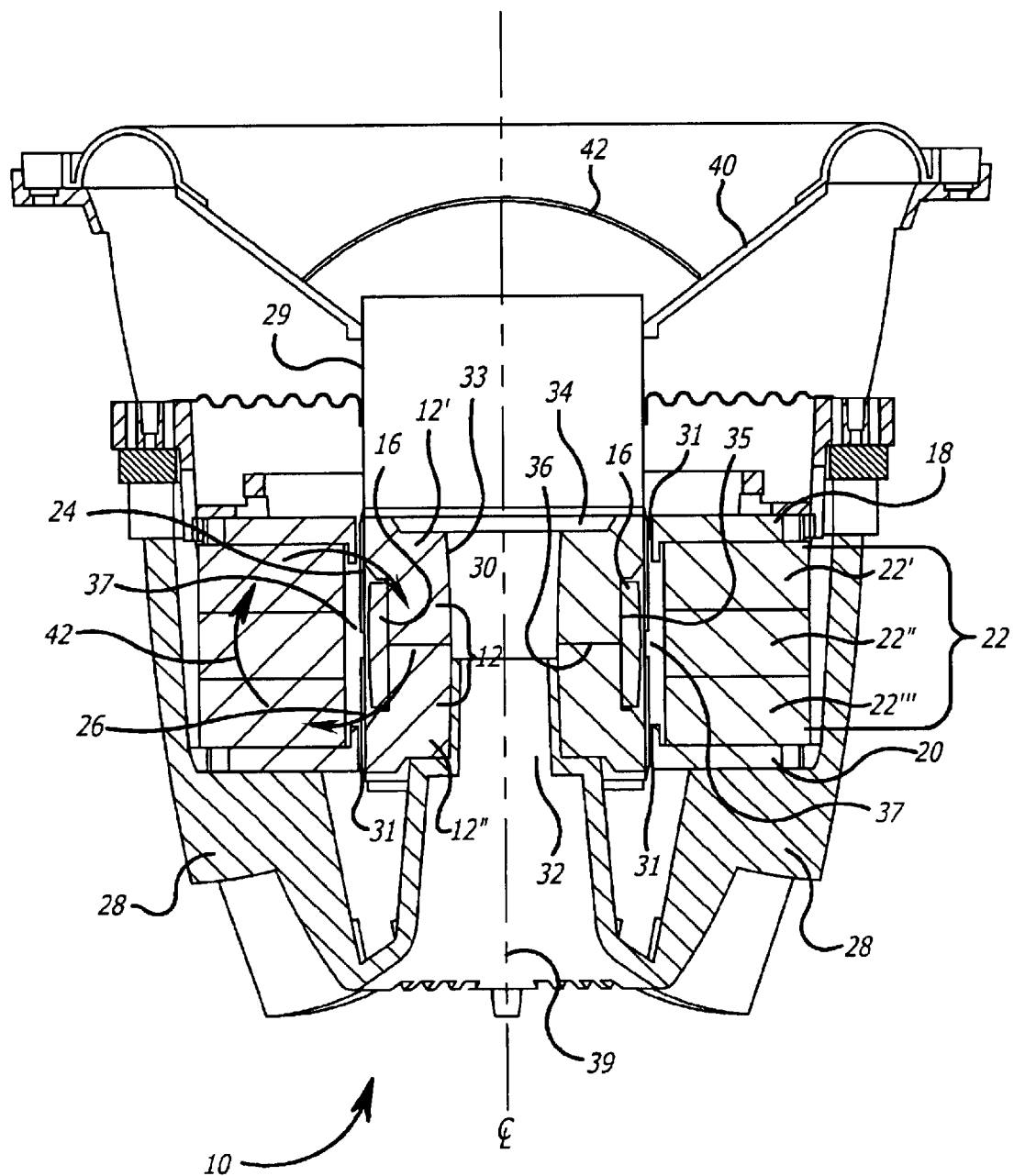
FIG. 1 is a cross-sectional elevational side view of an exemplary electromagnetic drive motor according to one embodiment of the present invention.

FIG. 1 illustrate by way of example one embodiment of an electromagnetic drive motor assembly (EDMA) 10 that includes an inner flux return assembly 12 including an upper pole piece 12' and a lower pole piece 12"; a flux stabilization ring 16 wrapped around the inner flux return assembly 12; a first voice coil 24 and a second voice coil 26 wrapped around a cylinder 29; an outer magnet assembly 22', 22", and 22''' is between a top plate 18 and a bottom plate 20; and the voice coils 24 and 26 are disposed in the pair magnet gaps 31 that are formed between the top plate 18 and the inner flux return assembly 12, and the bottom plate 20 and the inner flux return assembly 12 as well. Note that in this detail description, the plural form of the pair of magnetic gaps 31 may describe interchangeably as a singular form "magnetic gap 31." In between the pair magnetic gaps 31 is an intermediate gap 37. The EDMA is then enclosed within the housing 28.

There are several advantages to the EDMA as described above. For example, one of the advantages of having the flux stabilization ring 16 that is inside the cylinder 29 is that the flux stabilization ring 16 holds the inner flux return assembly 12 together; and at the same time improves the distortion in the EDMA as discussed below. Another advantage with the above embodiment is that having the outer magnet assembly along the exterior side of the cylinder 29 allows the EDMA to have a hole 30, along a centerline 39 of the EDMA 10. This allows the woofer's moving parts, i.e. cone 40, and dome 42, to move more freely as air within the hole 30 may escape through the hole 30 and not get trap to resist the movement of these parts. These and other benefits of the present invention and its alternative embodiments will be more fully discussed below.

As illustrated by way of example in FIG. 1, the upper and lower pole pieces 12', 12" may be symmetrical so that the upper pole piece 12' may be used in place of the lower pole piece 12", or vice versa. This way, the cost of manufacturing the upper and lower pole pieces is reduced because the same pole piece can be used for both the upper and lower pole pieces 12', 12"; rather than having to make two separate pole pieces 12', 12". An exemplary pole piece is generally shaped like a thick ring having an exterior side 34 and an interior side 36. To form the inner flux return assembly 12, the upper and lower pole pieces 12' and 12" may be placed together along its respective inner sides 36. That is, once the upper and lower pole pieces 12', 12" are combined they define a inner wall 33 and an outer wall 35, where the inner wall 33 defines the hole 30. The hole 30 allows air within the cylinder 29 to escape through the passage 32 formed within the housing 28. That is, air may travel through the centerline 39 defined by the hole 30 and passage 32. The upper and lower pole pieces 12', 12" may be made of any magnetically conductive material. Exemplary magnetic conductive material for the upper and lower pole pieces may be steel, nodular iron, or any other material known to one skilled in the art.

To hold the upper and lower pole pieces 12', 12" in place, the flux stabilization ring 16 may be annularly positioned around the upper and lower pole pieces, such that the flux stabilization ring concentrically contacts and aligns the upper and lower pole pieces. To do so, the upper and lower pole pieces 12', 12" are recessed in the outer wall 35 along the interior side 36 so that the diameter of the interior side 36 of outer wall 35 is smaller than the diameter along the exterior sides 34. Moreover, the inner diameter of the flux stabilization ring 16 may be smaller than the diameter of the outer wall 3along the interior side 36. As such, the upper and lower pole pieces 12', 12" may be press fitted together with the flux stabilization ring 16 along the interior side 36.

One of the advantages with using flux stabilization ring to fit the two pole pieces is the precise concentric alignment of the two pole pieces without the need of a fixture. This of course saves manufacturing time and cost. In traditional manufacturing process, a layer of glue may be used to combine the two pole pieces, and the flux stabilization ring 16; and for quality control, an outer diameter centering gauge may be used to assemble and check for misalignment between the pole pieces. Moreover, the flux stabilization ring holds the two pole pieces after they have been assembled; whereas if only glue is used to hold the two pole pieces together, after a period of time, the thermal expansion and contraction between the two pole pieces, and the heat applied to the glue may undo the glue so that the two pole pieces may become misaligned. With the flux stabilization ring 16, however, such problem is substantially eliminated.

With regard to the design of the conductive ring 16, one of the consideration is the electrical conductivity or low resistance of the ring material in terms of its effectiveness in counteracting the flux modulation. For example, given the same ring dimensions, a ring made of copper material will create a ring with a higher electrical conductivity than a ring made of aluminum, as copper is a better conductor than aluminum. That is, with a limited space, a ring with a smaller cross-sectional area may be used with a more electrically "efficient" material. At the same time, the size of the ring should be designed to stabilize the flux modulation up to the maximum operational power rating of the transducer. Generally, if the ring is over designed, i.e., larger cross-sectional area than necessary, the ring will be more than able to control modulation. On the other hand, if the ring is too small, the ring still works, but will reduced modulation to a lesser degree. That is, as current is increased in the coil, especially if the coil has many turns of wire, the coil's magnetic field greatly increases and if the ring is too small, it will not be able to generate enough counter force to stabilize the modulation.

In the past, conductive or flux stabilization rings were empirically designed. Now there are Magnetic FEA programs to model the behavior of various size flux stabilization rings on flux modulation. For example, Infolytica Corporation offers such a program called MagNet, the program may be obtained at 300 Leo Pariseau, Suite 2222, P.O. Box 1144, Montreal, Canada H2W 2P4. Contact Sales & Marketing Manager Max Zinger at 1-514-849-8752, ext# 270. Or visit WEB site at www.infolytica.com.

Besides the flux stabilization ring 16, the present invention may use some form of glue or adhesive between the two flux return pieces for added security between the two. The flux stabilization ring 16 may be made of any electrically conductive material known to one in the art. An example of material used to make the flux stabilization ring 16 is aluminum. Other examples include but are not limited to copper or any other low resistive material known to one skilled in the art.

Along the exterior side of the inner flux return assembly 12 and the flux stabilization ring 16, is the cylinder 29, which is attached to a cone 40, that extends from the cone 40 into the magnetic gap 31. The cylinder 29 is made of a stiff high temperature resistant material such as polyamide and may be about 7/1000 of an inch thick. Wound around the cylinder 29 and within the magnetic gap 31 is a dual coil of wire along the exterior side of the cylinder 29 comprised of two portions, the first coil portion 24 and the second coil portion 26 each being located within its own gap 31. The dual coil may be formed from a wire wound around a cylinder. In particular, the two coil portions 24, 26 may be externally wired either in parallel or in series. Such design, allows for a design that is connected to a pair of terminals "external" to the coil, thus allowing the flexibility of better optimizing the impedance load to the drive amplifier. Alternatively, the dual coil design may be "internally" pre-wired for either parallel or series connection.

Along the exterior side of the cylinder 29 is a magnet assembly 22 in between the top plate 18 and the bottom plate 20. In this embodiment, the magnet assembly 22 may be comprised of three layers of magnets, i.e., the first layer 22', the second layer 22", and the third layer 22'". One of the reasons for having three layer of magnets is for the cost considerations in that a unitary magnet may cost more and be more difficult to manufacture than assembling three layers of magnets. Of course, it is within the scope of the present invention to have a unitary magnet rather than an assembly of smaller magnets. Adhesive or glue may be used between the magnets; and between the magnet layer and the top and bottom plates 18, 20, to securely hold the assembly together. In this regard, U.S. Pat. No. 5,748,760, by Douglas J. Button, issued May 5, 1998, entitled "DUAL COIL DRIVE WITH MULTIPURPOSE HOUSING" is hereby incorporated by reference into this application.

In one embodiment, the first and second coil portions 24, 26 are disposed in the magnetic gap 31 such that the flux stabilization ring 16 is positioned between the coil portions 24, 26 and the upper and lower pole pieces. The first and second coil portions may be vertically opposed to each other such that one coil portion is situated above the other coil portion. The first coil portion 24 may be generally juxtaposed to the top plate 18, and the second coil portion 26 may be generally juxtaposed to the bottom plate 20. The positioning of the first and second coil portions may slightly vary in range relative to the top and bottom plates 18, 20, consistent with normal engineering practices. For example, the length of the first and second coil portions, 24, 26, and their axial placement relative to each other and the magnetic gaps 31, may be optimized for various uses; i.e. high efficiency or high excursion applications. The dual coil may be also positioned substantially perpendicular to the directional flow of the magnetic field generated by the magnet. The first and second coil portions are additionally positioned within the magnetic gap formed by the two pole pieces and the top and bottom plates.

Enclosing the EDMA is a housing 28 having a cylindrically oriented chamber. The chamber includes a center, with the passage 32 forming a continuous opening with the hole 30. In one embodiment, the flux stabilization ring 16 and the upper and lower pole pieces 12', 12" are press fitted and/or glued within the chamber.

As shown by way of example in FIG. 1, with the above embodiment, the north pole represented by the first layer of magnet 22' and the south pole represented by the third layer of magnet 22''', the magnetic flux lines 42 generally flow from the north pole to the south pole. That is, from the first layer of magnet 22', the flux lines 42 pass through: the top plate 18; the magnetic gap 31; the upper and lower pole pieces 12' and 12"; the magnetic gap 31 again; the bottom plate 20; and to the third layer of magnet 22'''.

In particular, the configuration of the upper and lower pole pieces 12', 12" may be optimized depending on the density of the flux lines 42 traveling through the upper and lower pole pieces 12', 12". That is, the configuration of the upper and lower pole pieces 12', 12" are optimize so that the flux lines 42, having a certain density passing through the upper and lower pole pieces 12', 12", are not squeezed to a point where the upper and lower pole pieces 12', 12" are magnetically saturated. Put differently, as the density of the flux lines 42 increase, the upper and lower pole pieces 12', 12" made of steel becomes more saturated to a point where the upper and lower pole pieces 12', 12" cannot handle any more return of the flux lines 42. On the other hand, excess steel adds weight to the EDMA 10 and the flux lines 42 are not as focused passing through the upper and lower pieces 12', 12". Hence, to optimize the configuration or design of the pole pieces, Finite Element Analysis (FEA) may be used to design the pole pieces to operate at a predetermined saturation level. This may be done by optimizing the cross-sectional area and providing steel where it is needed and removing steel where it is not needed. This way, the weight of the inner flux return assembly 12 is minimized, yet the flux lines 42 are focused where they need to be. As discussed further below, focusing the flux lines 42 along predetermined areas improve modulation that may occur within the EDMA 10. Of course, other methods known to one skilled in the art may be used to optimize the inner flux return assembly 12.

Furthermore, with the above embodiment, the air noise and distortion are minimized because air within the cylinder may escape through the hole 30 and passage 32. Without the hole 30 and passage 32, air inside the cylinder would be substantially trapped and pressurized as the dome 42 and cylinder 29 move down relative to the inner flux return assembly 12. This in turn forces air through the narrow gaps between the cylinder 29 and the inner flux return assembly 12 and generates a symmetrical resistive force which creates noise and also third harmonic distortion.

Still another advantage with the above embodiment is that the distortion in the EDMA 10 is improved. By way of background, the outer magnet assembly creates a static magnetic field and as current is passed through the dual coils, the dual coils move; at the same time, the current passing through the dual coils also creates a magnetic field around the wire, as a result, the magnetic field around the wire moves within the static magnetic field of the outer magnet assembly. This creates a "global" modulation effect of the static magnetic field so that asymmetrical or second harmonic distortion is created. The flux stabilization ring 16, however, acts as a damper to generate a magnetic field that is substantially equal and opposite to counter act the modulation effect between the two magnetic fields. That is, as the static magnetic field, generated by the outer magnet assembly, moves up and down, that too generates a current through the flux stabilization ring 16. The flux stabilization ring 16 may be made of aluminum, for example, or any low resistivity material and be a shorten turn, in this case, one turn, in which the flux lines 42 travel through its center. In other words, the current through the flux stabilization ring 16 generates a magnetic field around the flux stabilization ring 16 as well, that is substantially equal and opposite to counter act the modulation effect between the two magnetic fields. As discussed above the amount of modulation is directly related to the number of turns in the coil and current being applied, or the total Amp-turns.

Yet another advantage with the flux stabilization ring 16 is dissipating heat away from the dual voice coil because of its proximity to the dual voice coils. The flux stabilization ring 16, typically being made of aluminum or copper, is much more thermally conductive, and thus will be more efficient at drawing heat away from the coils than if the area was taken up by steel of the pole pieces 12', 12". Also, by placing a ring of this higher thermally conductive material inside the cylindrically oriented chamber of the housing, greater surface area is added to the motor component structure, thereby providing more, and better, material through which heat can dissipate from the coil(s). If the heat generated by the coils is not dissipated, eventually, any adhesive holding the wire onto the cylinder will melt, detaching the wire from the cylinder and causing the loudspeaker to cease functioning. Moreover, as mentioned above, some magnets will demagnetize if they get too hot. Therefore, placing a ring around the components of the motor, as in the magnet cover 28, provides more surface area through which heat can dissipate, thereby contributing further to the proper function of the speaker containing the motor. An example of this would be an amplifier using an external heat-sink to increase the thermal performance of an electronic component attached to it. The heat-sink achieves this by offering a better and larger medium for the component to radiate the heat into, which then in turn is radiated into the surrounding air.

Figure 2A:
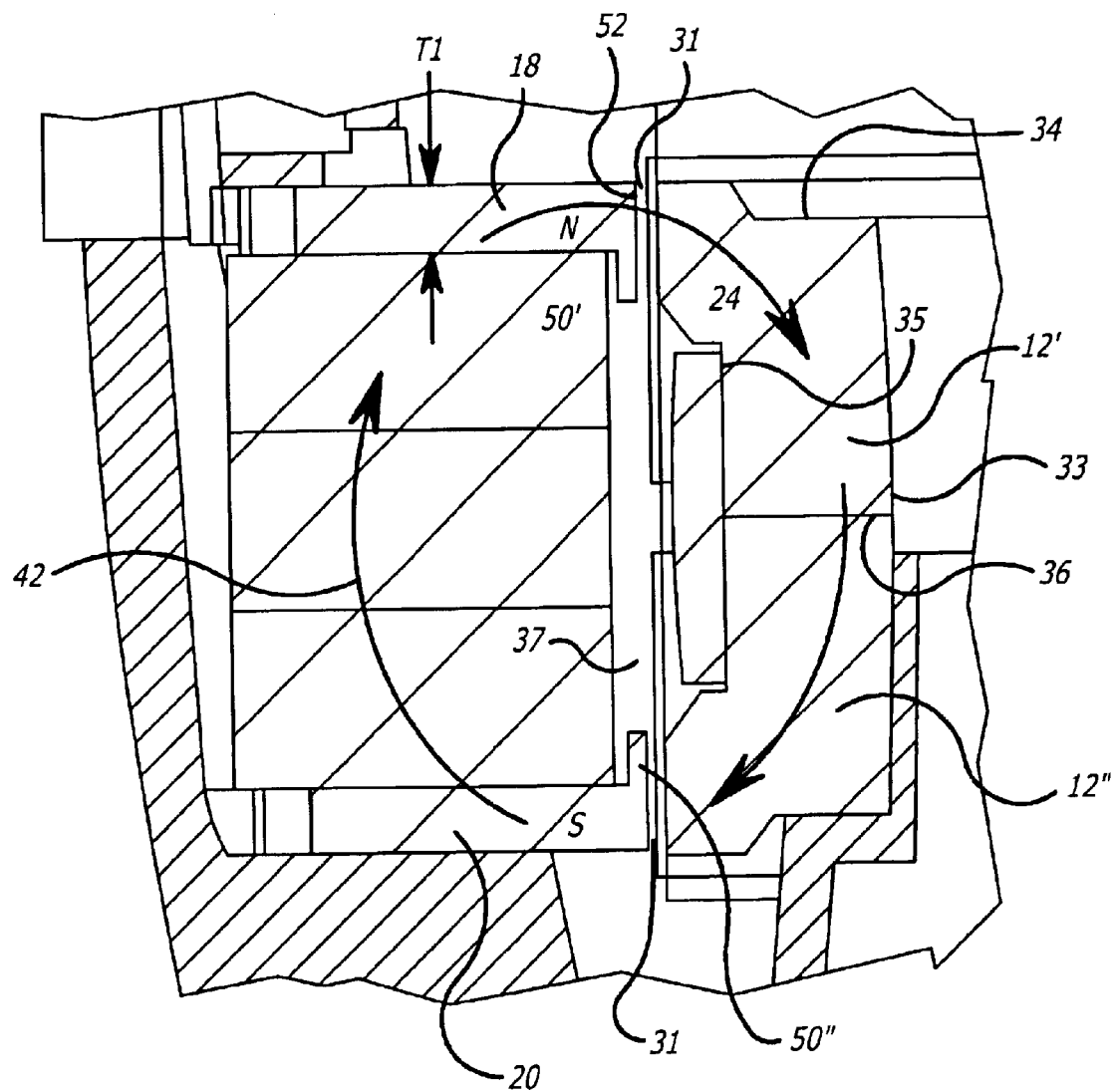
FIG. 2A is an enlarged cross-sectional view according to FIG. 1 illustrating an exemplary flow of flux lines through the magnetic gaps.

FIG. 2A illustrates in further detail the magnetic gap 31 between the top and bottom plates 18, 20 and the inner flux return assembly 12 that is designed to minimize the "local"

flux modulation effect in the magnetic gap 31. By way of background, the modulation within the magnetic gap 31 in part depends on the saturation level of the steel in close proximity to the magnetic gaps 31, formed by the top and bottom plates 18, 20 and the upper and lower pole pieces 12', 12". Put differently, the pole plates 18, 20 and/or the pole pieces 12', 12" are highly saturated, i.e., the density of the flux lines 42 is condensed to the point the cross-sectional area of the steel can not support any more flux lines 42. This results in the magnetic field within the steel material becoming more stable thus resisting modulation. Conversely, if the top and bottom plates 18, 20 or the pole pieces 12', 12" are well under saturated, then the flux lines 42 are not tightly focused and, therefore, the magnetic field is weak so less stable. Put differently, a "stiff" or dense concentration of magnetic field in the steel forming the magnetic gap around the voice coil will minimize the "local" and to some degree "global" modulation, i.e., stay stable. Being that this is a symmetrical and asymmetrical phenomenon, this improves both second and third harmonic distortion.

As discussed above, for a given magnetic flux level, as the cross-sectional area of the steel increases, the average magnetic flux through the same cross-section decreases. Conversely, as the cross-sectional area of the steel decreases, the average magnetic flux through the same cross-sectional area increases, so it becomes more saturated. On the other hand, if the cross-sectional area of the steel becomes oversaturated, then there is a limit as to how much magnetic flux that may pass through the cross-sectional area of the steel. By analogy, this is like a traffic jam in the street so that no more cars can pass through the street. This means that there is less magnetic flux in the magnetic gap. 31 to drive the woofer. Therefore, in designing the pole plates 18, 20, there is a trade off between low distortion and higher output energy when comparing designs of the same weight of permanent magnetic material.

With the present invention, however, the distortion and the energy level in the magnetic gap 31 are optimized. To do so, the thickness "T1" of the top and bottom plates is designed to run below its magnetic saturation point and, therefore passing most, if not all, of the flux lines 42 therethrough. By way of background, magnetic saturation may be described as a condition in which a body is magnetized and exhibits no further increase of magnetization upon further increase in an external magnetic field. This means that depending on the particular composition of a ferromagnetic material and its size, there is a maximum level of magnetic field strength that it can handle. Magnetic field strength is typically measured in units of Gauss. Where Gauss is the centimeter-gram-second electromagnetic unit of magnetic flux density, equal to one maxwell per square centimeter [After Karl. F. Gauss]. For instance, ferromagnetic material such as steel, depending on its composition may have a magnetic saturation point between 10,000 Gauss and 22,000 Gauss. In other words, depending on the composition of the steel, some steel may have a higher magnetic saturation capability than others.

For instance, if a particular ferromagnetic material, such as steel, has a magnetic saturation point at about 17,000 Gauss, then based on the strength of magnetic field or the predetermined flux lines 42 that is generated by the magnet assembly 22, the thickness "T1" of the top and bottom plates 18, 20 may be designed to reach a maximum level of magnetic flux strength that is up to about 17,000 Gauss using FEA for example. Moreover, as shown by way of example in FIG. 2A, the top and bottom plates 18, 20 may be further provided with an extended plate tip 50' having a tip length "T2" that is substantially parallel and adjacent to the voice coil 24. That is, the extended plate tip 50' provides a thin cross-sectional area of material adjacent to the voice coil and inner flux return assembly, so that more magnetic flux lines 42 may travel through the plate tip 50', and operate within the magnetic saturation region at about or above 17,000 Gauss. In other words, more material is provided where it is needed the most so that the magnetic flux can run through the magnetic gap 31. This means that there is more energy or motor force to drive the woofer, while at the same time, the flux level 42 running through the plate tip 50' of the top and bottom plates 18, 20 is saturated to reduce the modulation and distortion as discussed above.

Alternatively, the thickness "T1" of the top and bottom plates 18, 20 may be designed to reach the magnetic saturation point as well, yet still less saturated than the plate tip 50' near the magnetic gap 31. In such instances, however, the EDMA 10, may not operate optimally because less magnetic field is passed through the plate tip 50' and through the magnetic gap 31.

One way to determine whether the top and bottom plates 18, 20 are magnetically saturated or not is through a FEA program. To do so, the design of the EDMA 10, i.e., dimensions and materials used for each of the components, may be interred into a FEA program, and based on the material and dimensions of the magnet assembly 22, the FEA program can predict the saturation level of a particular area. For example, the FEA program can predict whether the plate tip 50' is saturated or not. Moreover, the FEA program can predict the flux density in the magnetic gap 31. And one skilled in the art may verify the predicted flux density in the magnetic gap 31, by measuring the flux density in the magnetic gap using a fluxmeter. For instance, an "Integrating Fluxmeter" Model MF-3A, may be used to measure the flux density in the magnetic gap 31, which is made by Walker Scientific Inc., Rockdale St., Worcester, Mass. 01606. And if the FEA program's predicted value is similar to the measured value, then one ordinarily skilled in the art can verify that the predicted values from the FEA program is substantially accurate. Again, a FEA program such as MagNet may be used to predict the saturation level of the components in the EDMA 10. Alternatively, the field strength of a particular components may be measured as well to determine the saturation level.

Yet another advantage with the plate tip 50' is that it further dissipates heat away from the dual voice coils. For example, placing the plate tip 50' adjacent to the voice coil 24 minimizes the thermal resistance from the coil wire to the steel in the magnetic gap 31. This way, the plate tip 50' draws heat away from the first and second coil portion 24, 26, and quickly dissipates the heat through the housing 28. The tip length T2 may vary of course to further minimize the thermal resistance of the magnetic gap 31 and to draw more heat from the voice coil. The tip length T2, however, should not be so long that a magnetic short circuit is created between the two plate tips 50', 50" from the top and bottom plates 18, 20, as the two plate tips 50', 50" get close to one another.

Figure 2B:
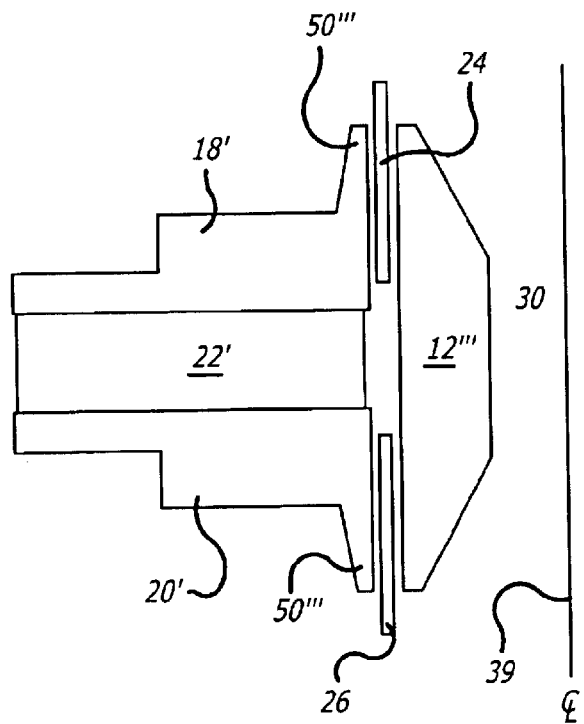
FIG. 2B is an enlarge cross-sectional view illustrating yet another alternative embodiment of the present invention.

FIG. 2B illustrates by way of example another embodiment of the top and bottom plates 18', 20' each having a respective plate tip 50'" that face away from each other and juxtaposed to the corresponding dual coils 24 and 26. Moreover, in this embodiment, the inner flux return 12' and/or the magnet 22' may be one piece rather than comprising of a multiple pieces as described in FIG. 2A. Still further, it is within the scope of the present invention to not have the flux stabilization ring 16. Note that in this embodiment, the centerline 39 is adjacent to the inner flux return 12' defining the hole 30 therein.

Figure 2C:
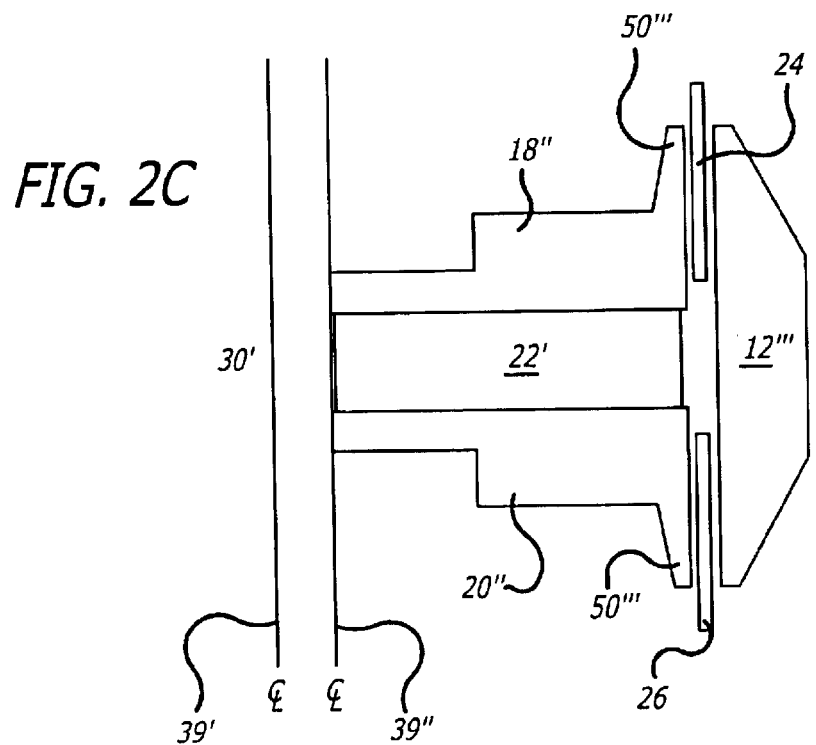
FIG. 2C is a cross-sectional view illustrating still another alternative embodiment of the present invention.

FIG. 2C illustrates by way of example still another embodiment of the present invention where the centerline 39' is adjacent to the top and bottom plates 18", 20", rather than the inner flux return 12". In other words, the top and bottom plates 18", 20", and the magnet 22" may be within the dual coils 24, 24 and configured like a ring disk with an opening along its center to define the hole 30'. Moreover, the inner flux return in this embodiment is outside of the dual coil 24, 26 and is adjacent to the housing 28. Yet another alternative is to have the centerline 39" defining the edge of the top and bottom plates 18", 20", and the magnet 22" so that no hole 30' is formed.

Figure 3:
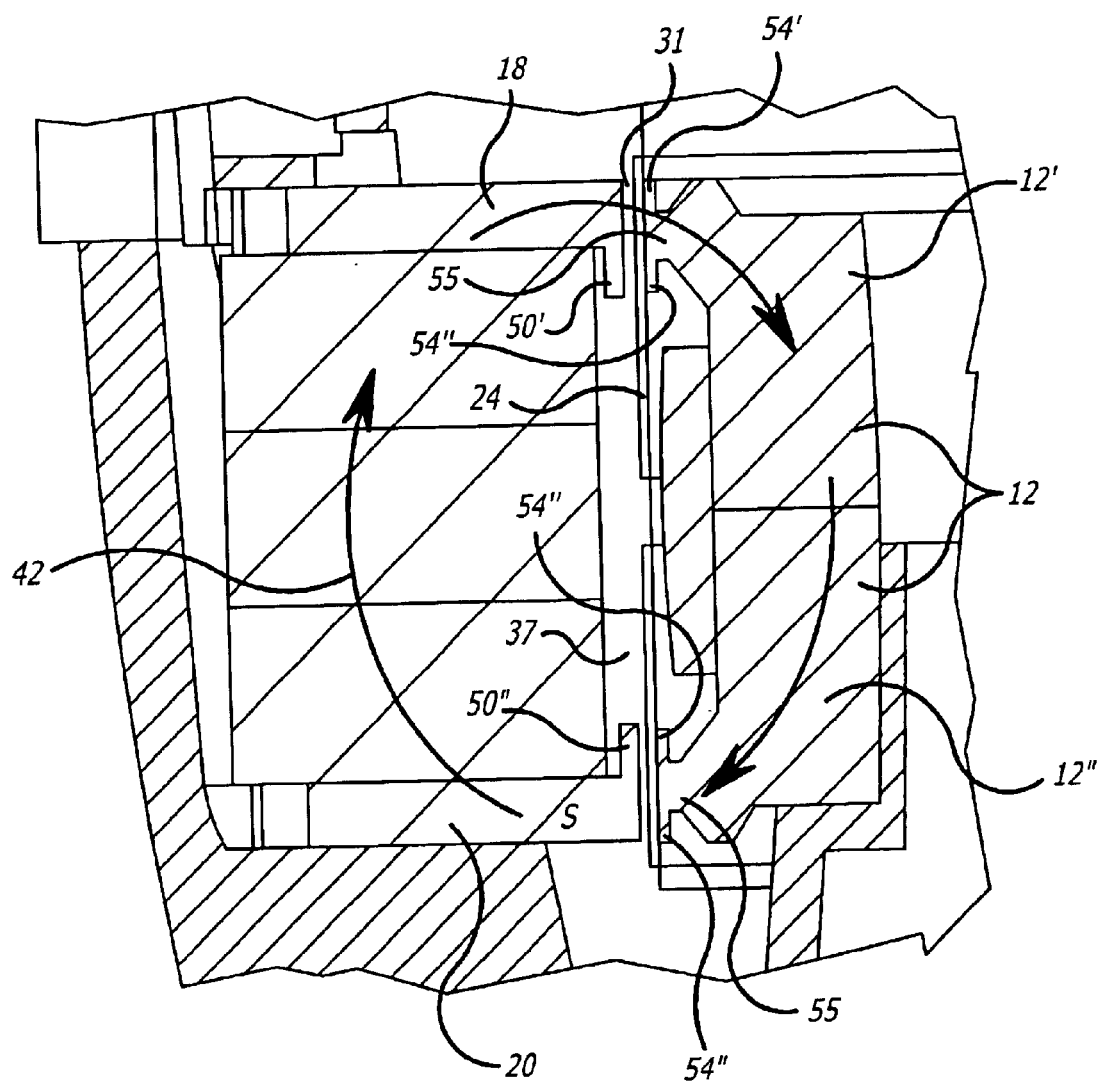
FIG. 3 is an enlarged cross-sectional view around the magnetic gaps according to another embodiment of the present invention.

FIG. 3 illustrates by way of example another embodiment of the present invention to provide the inner flux return assembly 12 with pole tips 54' and 54" extending from the small cross-sectional area 5that is formed adjacent to the dual voice coils 24 and 26. That is, based on the predetermined flux lines 42 that will pass through the top and bottom plates 18, 20 the thickness of the cross-sectional area 55 and the pole tips 54' and 54" may be designed to operate within the saturation region of the ferromagnetic material. For example, when still is used, depending on its composition, the magnetic flux strength of may be about 10,000 Gauss to about 22,000 Gauss. Put differently, the region adjacent to the magnetic gap 31 is saturated. In other words, similar to the plate tips 50', 50", the pole tips 54', 54" steel becomes saturated and thus "stiffens" the magnetic field 42 within the steel of the pole piece, thereby minimizing modulation and improve distortion. For reasons described above, thermal resistance from the voice coils to pole pieces is also improved, further improving the dual voice coils heat dissipation.

Figure 4:
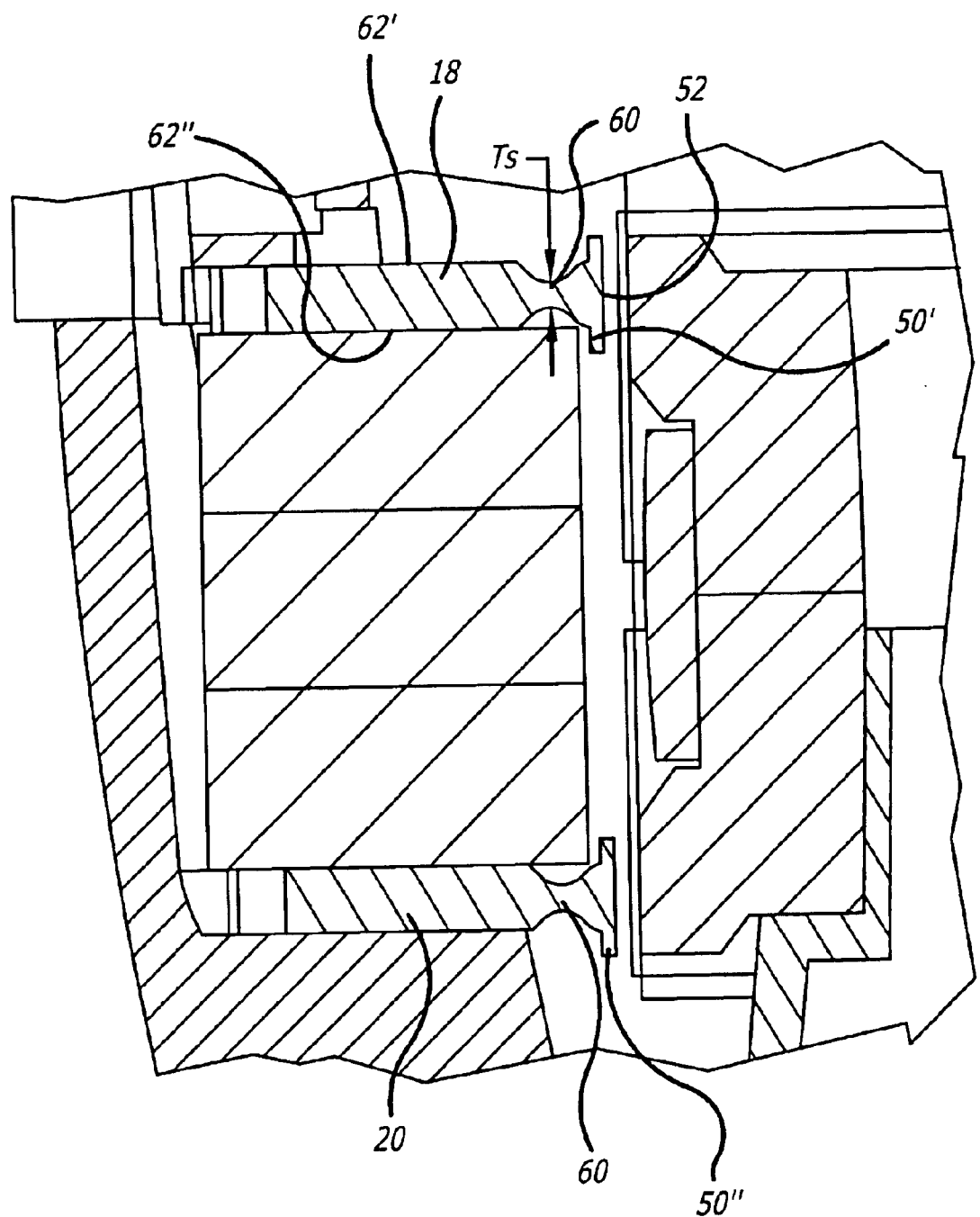
FIG. 4 is an enlarged cross-sectional view around the magnetic gaps according to yet another embodiment of the present invention.

FIG. 4 illustrates by way of example yet another embodiment of the present invention showing the top and bottom plates 18, 20 may have a smaller cross-sectional area 60 to increase the saturation in that area near the gap 31. Again, the flux lines 42 traveling toward the gap 31, is first "squeezed" or densely packed through the narrow cross-sectional area 60, thus highly saturating it. That is, based on the predetermined flux lines 42 that will pass through the top and bottom plates 18, 20 the thickness "Ts" of the cross-sectional area 60 and the plate tips 50' and 50" may be designed to operate within the magnetic saturation region of the ferromagnetic material using FEA for example. Again, for steel, the high magnetic flux strength of may be about 10,000 Gauss to about 22,000 Gauss. As mentioned above, although this highly saturated condition improves distortion, it may come at the penalty of a slight trade off with reduced magnetic field strength in the gap 31.

Figure 5:
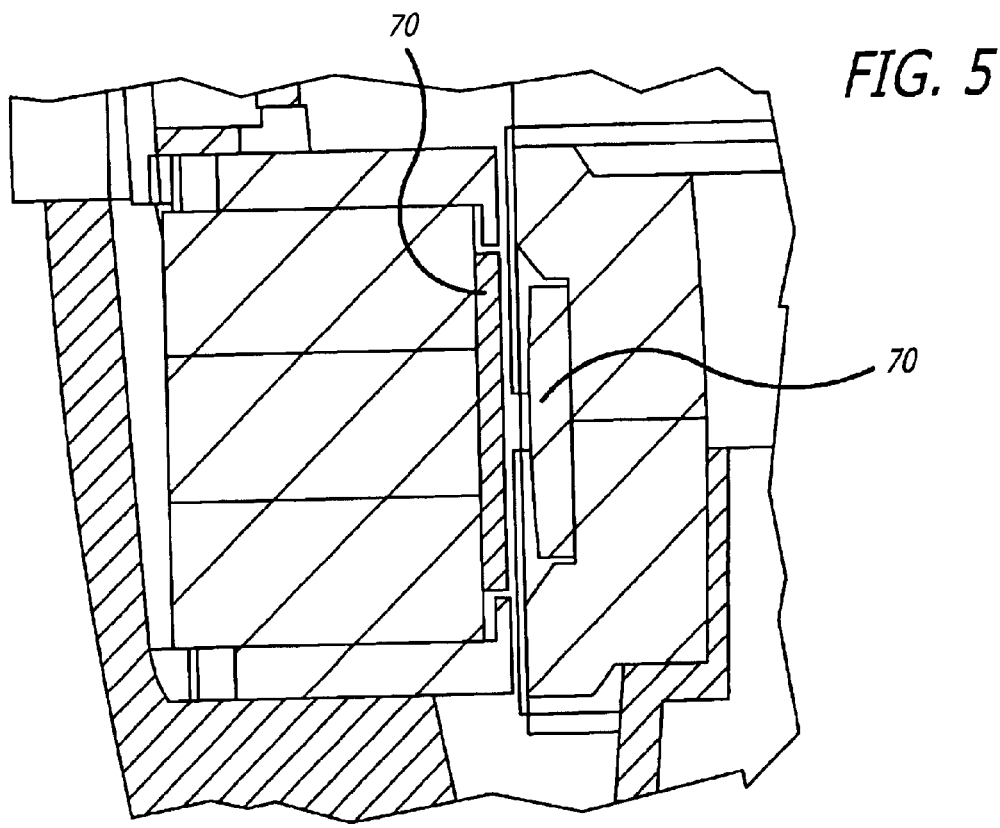
FIG. 5 is an enlarged cross-sectional view around the magnetic gaps according to still another embodiment of the present invention.
Figure 6:
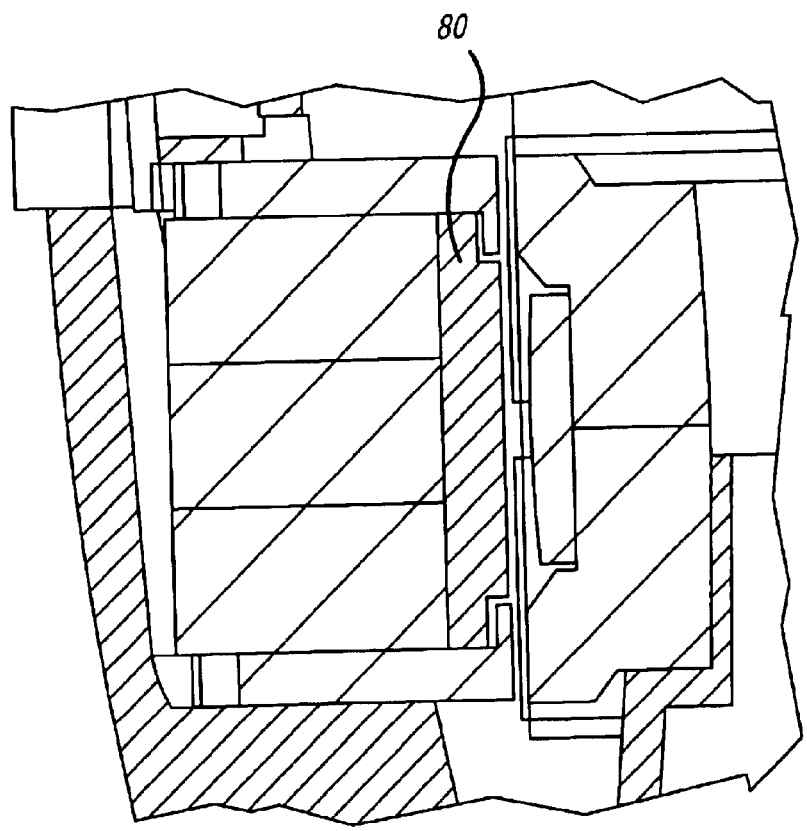
FIG. 6 is an enlarged cross-sectional view around the magnetic gaps according to yet. another embodiment of the present invention.

FIG. 5 illustrates by way of example still another embodiment of the present invention providing, in place of or in addition too, a second outer flux stabilization ring 70. In this embodiment, the second flux stabilization ring 70 may be provided to further counter act the modulation effect similar to the flux stabilization ring 16. Moreover, the second outer flux stabilization ring 70 further dissipates heat away from the voice coils and the magnetic air gap 31 due to its close proximity to the coils. Still further, as illustrated by way of example in FIG. 6, a larger cross-sectional area, second outer flux stabilization ring 80 may be use to further improve heat transfer and counter act the modulation.

Figure 7A:
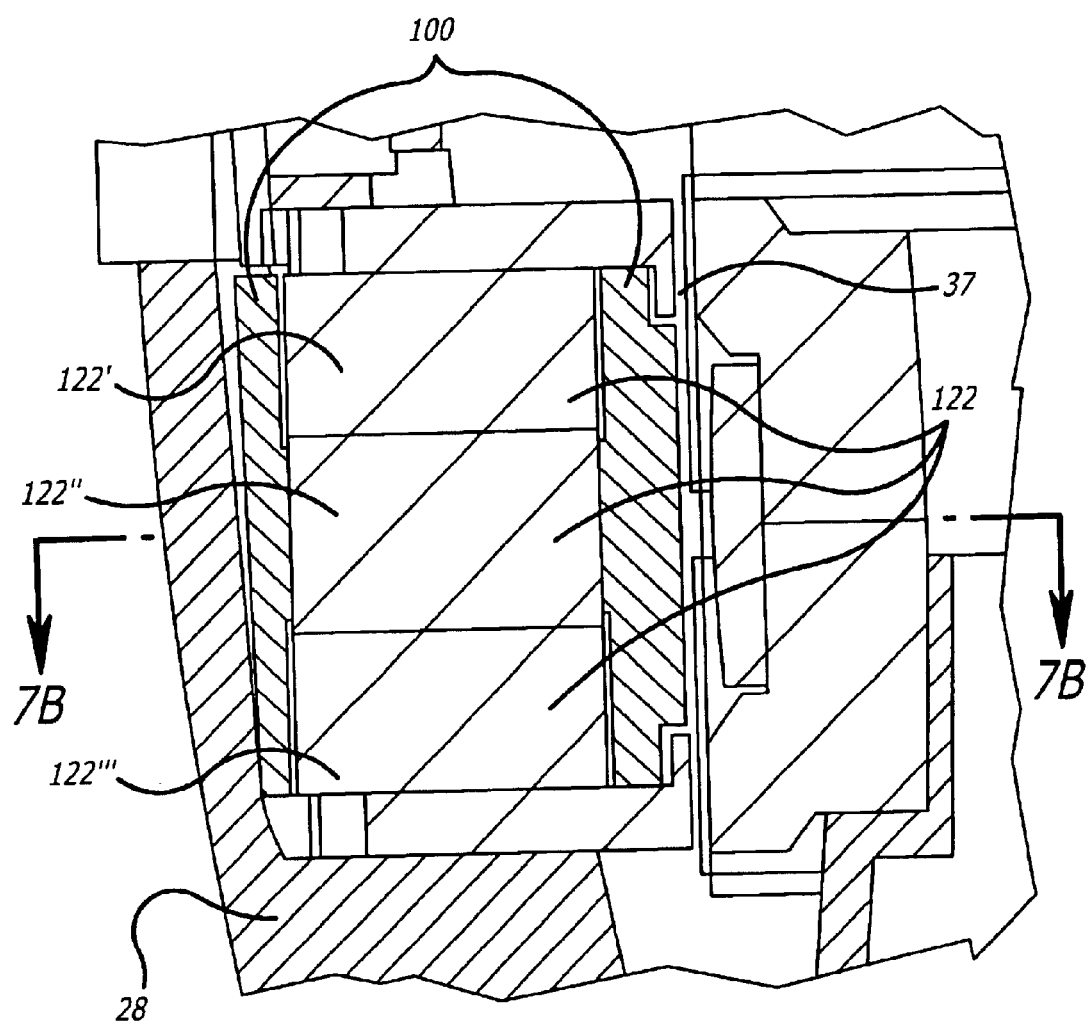
FIG. 7A is an enlarged cross-sectional view of a thermal radiating conductive ring (TRCR) along the line 7A—7A in FIG. 7B below, illustrating yet another embodiment of the present invention.
Figure 7B:
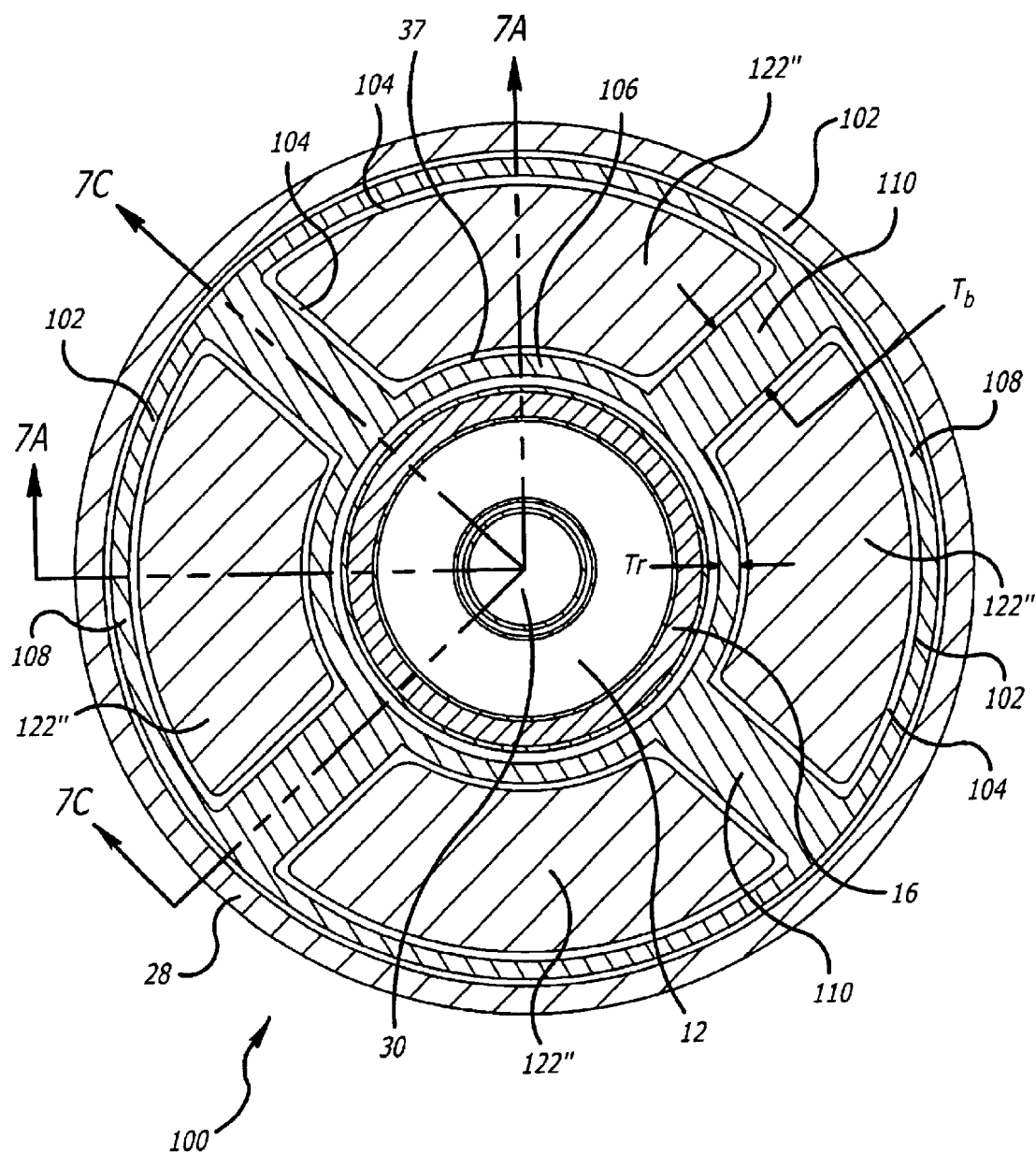
FIG. 7B is another cross-sectional view of the TRCR according to FIG. 7A along the line 7B—7B.
Figure 7C:
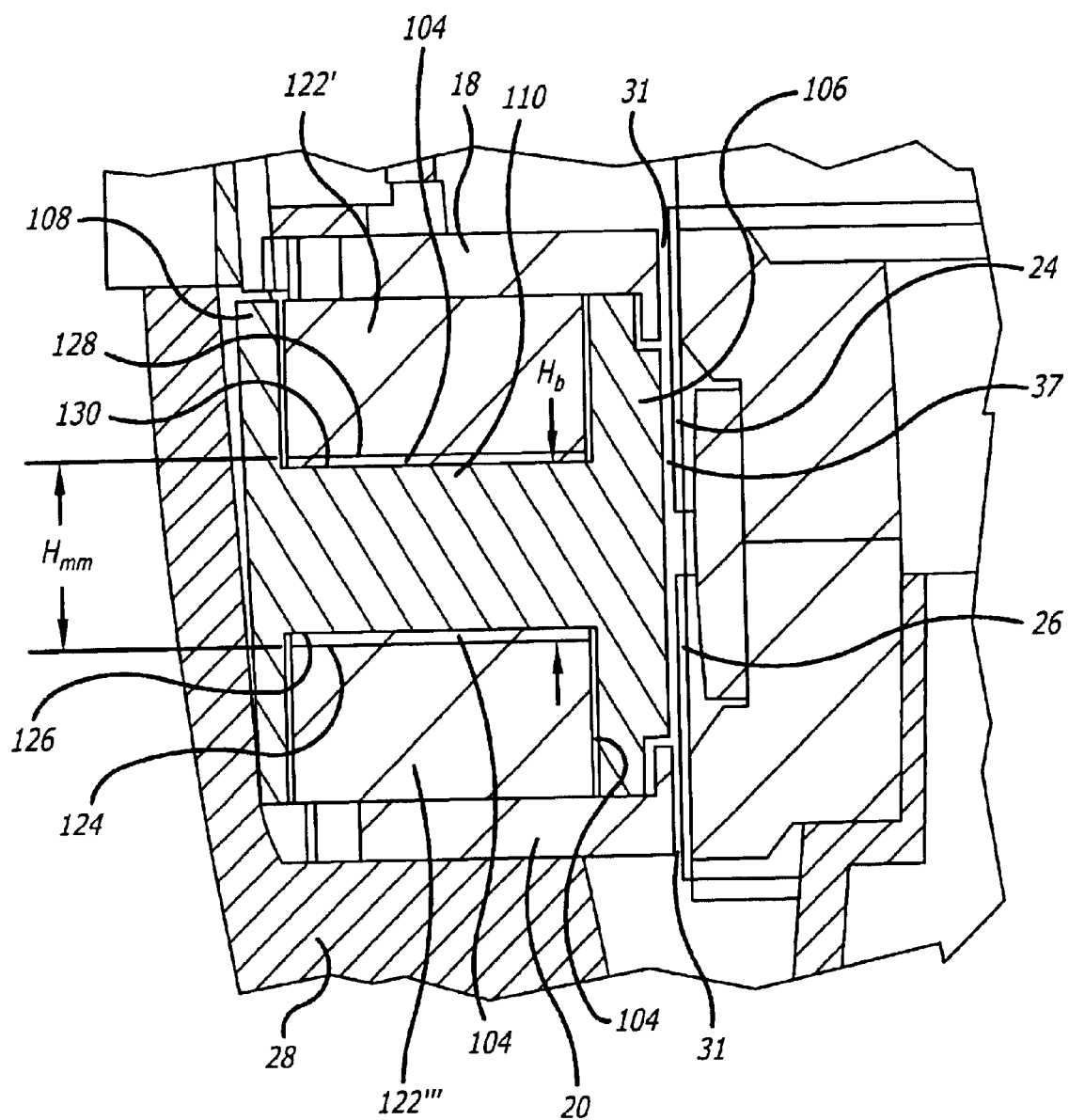
FIG. 7C is still cross-sectional view of the TRCR along the line 7C—7C in FIG. 7B.

FIGS. 7A–7C illustrates by way of example a Thermal Radiating Conductive Ring (TRCR) 100 according yet another alternative embodiment of present invention. In this embodiment, the TRCR 100 is designed to more directly radiate the heat away from the intermediate and magnetic gaps 37, 31 and to the outer housing 28. As shown in FIG. 7B, the radiator 100 is generally defined by an inner ring 106, an outer ring 108, and four bridges 110 in between the inner ring 106 and the outer ring 108; thereby forming four openings 102. Disposed within each of the openings 102 are respective magnets 122" substantially filing the openings. Of course, depending of the dimensional tolerances of the magnets 122", the four magnets 122" may be pressed fitted into the openings 102 or a small gap 104 may be formed between the magnets 122" and the radiation ring 100. Although this embodiment illustrates four openings, a TRCR having at least two or more openings is within the scope of the present invention. Moreover, the openings need not be equal in size or shape. That is, a TRCR may have six openings, each opening having different size and shape to receive six corresponding magnets for example. To form a good conductive contact, adhesive may be used between the magnets 122" and the TRCR 100.

As shown in FIG. 7C, which is a cross-sectional view along the line 7C–7C in FIG. 7B, the inner ring 106 substantially forms one of the side walls that defines the intermediate gap 37. That is, the inner ring 106 acts like a heat sink and conducts heat away from the intermediate gap 37 and the magnetic gap 31, through the bridge 110, and then through the to outer ring 108. From the outer ring 108, the heat is then radiated through the housing 28. One of the advantages with this embodiment is that the bridge 110 forms a direct thermally conductive channel between the inner and outer rings 106, 108 so that the heat can be efficiently conducted away from the intermediate gap 37 and the magnetic gap 31. Moreover, using FEA, the height "Hb" and thickness "Tb" of the bridge 110, and the thickness "Tr" of the inner ring 106, may be varied to optimized the thermal conductivity of the bridge 110.

As further illustrated in FIGS. 7A and 7C, the magnet assembly 122 including the upper magnet 122', middle magnet 122", and lower magnet 122'" may be assembled with the radiation ring 100 such a way that there is a small gap 104 between the two. The small gap 104 minimizes the heat from conducting through the magnet 122 so that most, if not all, of the heat from the intermediate and magnetic gaps 37, 31 is transferred from the inner ring 106 to the outer ring 108. This way, the magnet 122 stays cooler, and therefore does not get demagnetize from getting too hot. To provide the small gap 104, the lower magnet 122'" may be provided so that the top surface 124 of the lower magnet 122'" is slightly below the bottom surface 126 of the bridge 110; and the bottom surface 128 of the upper magnet 122' is slightly above the top surface 130 of the bridge 110. Moreover, the height "Hb" of the bridge 110 may be less than the height "Hmm" of the middle magnet 122" (see FIG. 7C).

With the above pieces, the magnet assembly 122 and the TRCR 100 may be assembled in the following exemplary way: first, the lower magnet 122'" shaped like a disk ring may be placed underneath the bottom surface 126 of the TRCR 100; second, as shown in FIG. 7B, four middle magnets 122" may be placed within the four openings 102; and third, as shown in FIG. 7C, the upper magnet 122' also shaped like a disk ring may be placed over the top surface 130. Moreover, to hold the magnets 122', 122", and 122'" together, adhesive may be used among the magnets. Note that the upper and lower magnets 122', 122'" may have same height so that they may be used interchangeably.

Figure 7D:
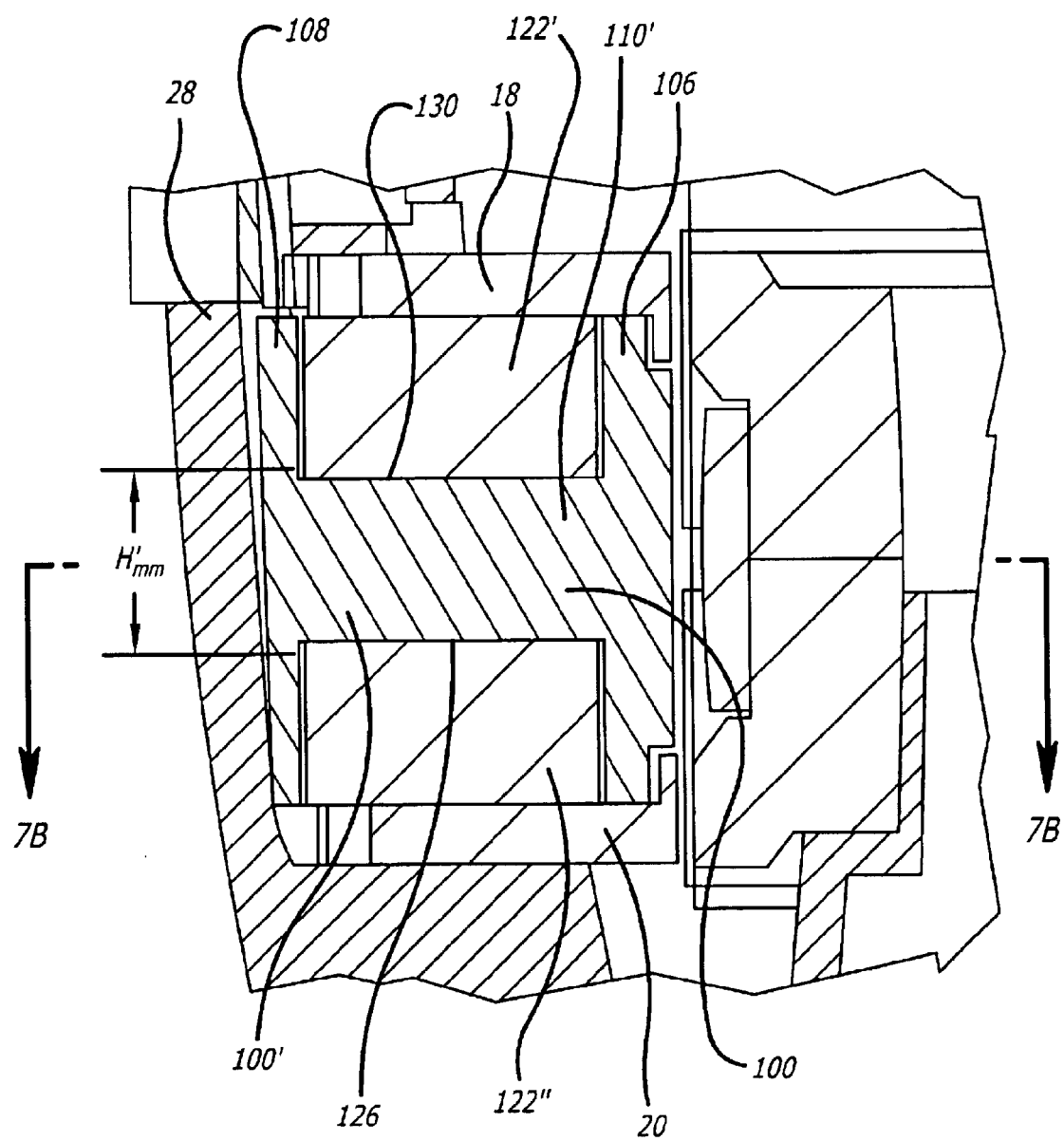
FIG. 7D is an enlarged cross-sectional view yet another alternative embodiment of the TRCR along the line 7C—7C in FIG. 7B.
Figure 7E:
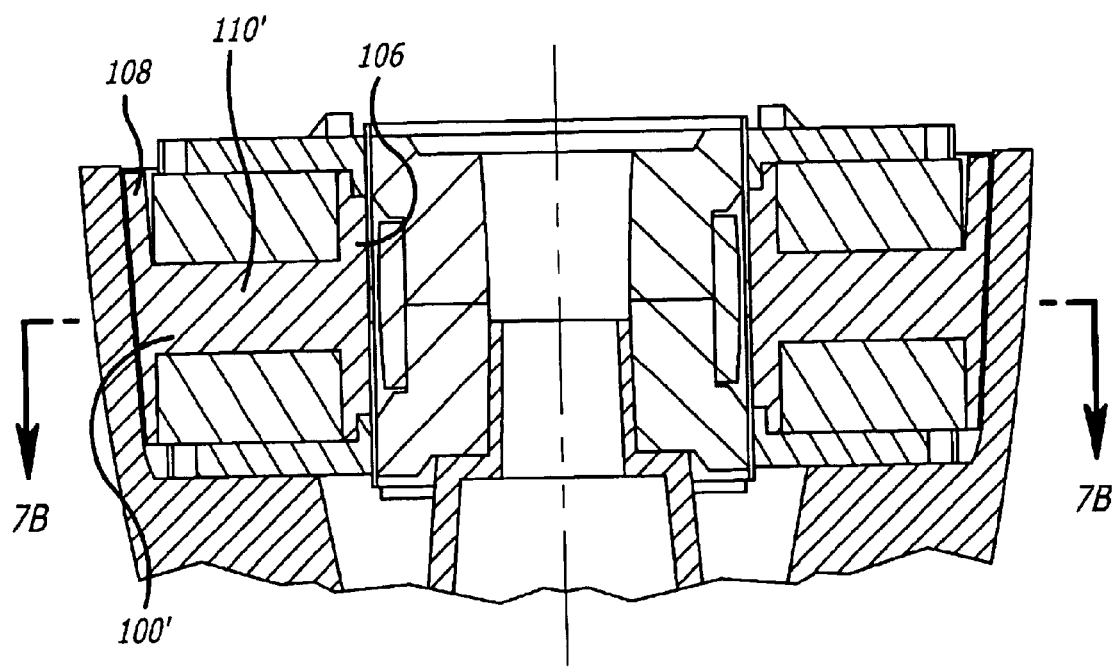
FIG. 7E is a broad cross-sectional view of the TRCR according to FIG. 7D.
Figure 8A:
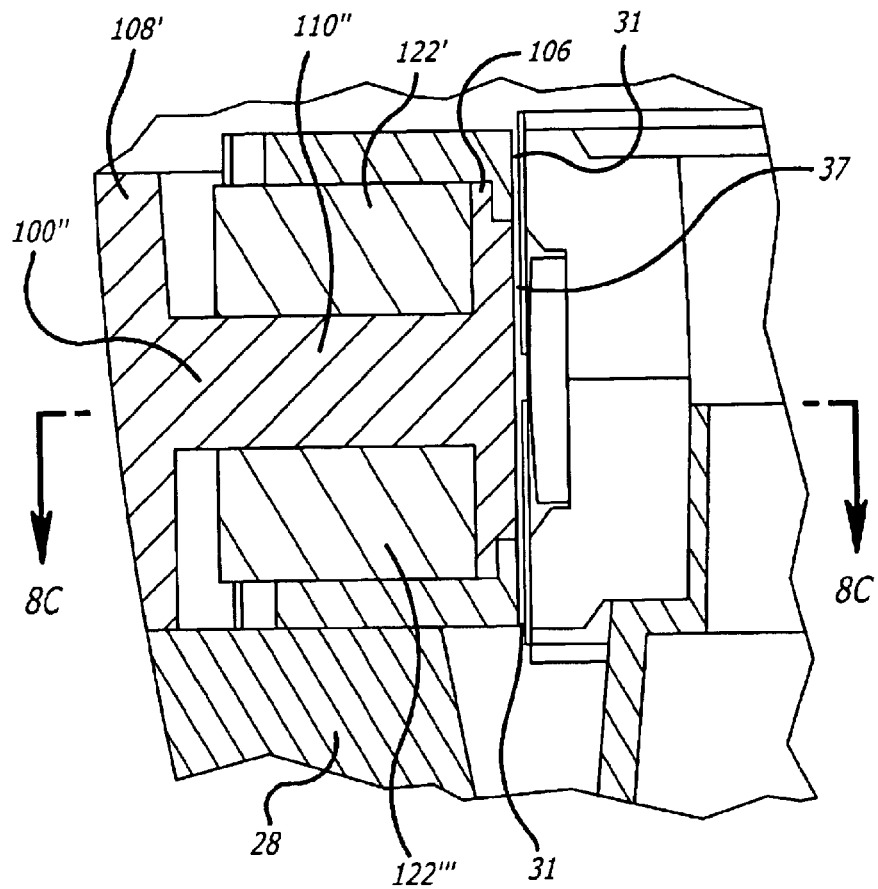
FIG. 8A is an enlarged cross-sectional view of a thermal radiating conductive ring (TRCR) along the line 8A—8A in FIG. 8C below, illustrating still another embodiment of the present invention.
Figure 8B:
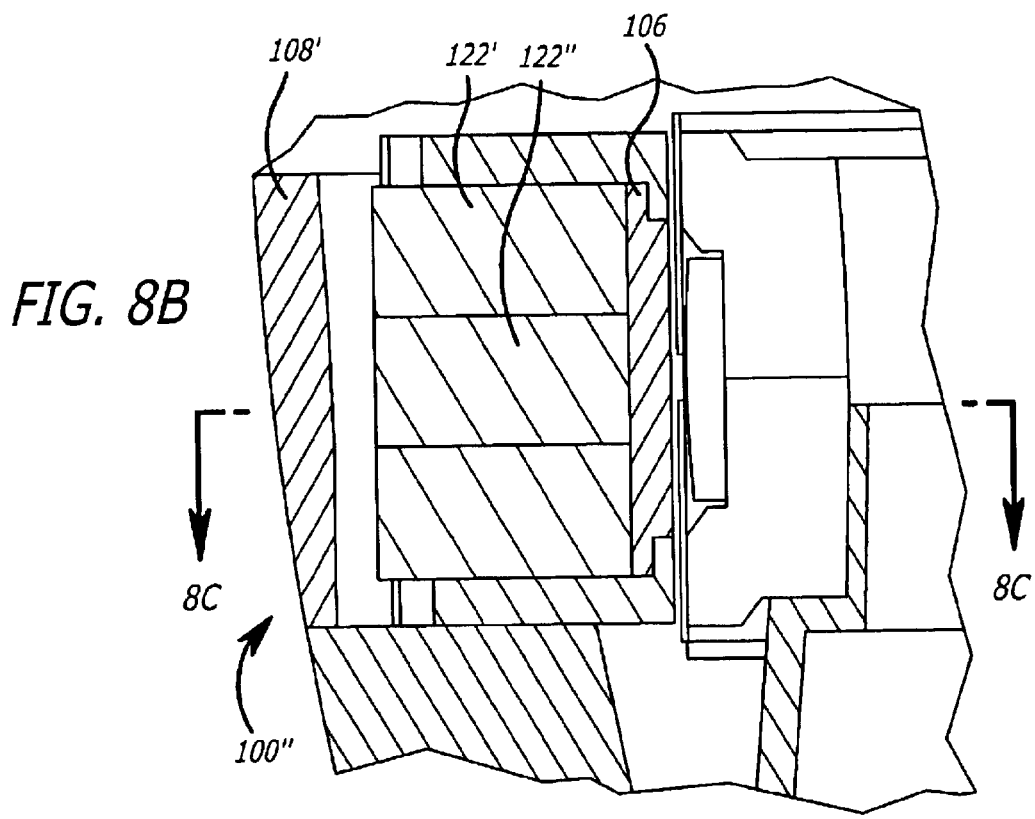
FIG. 8B is another cross-sectional view of the TRCR according to FIG. 8A along the line 8B—8B in FIG. 8C.
Figure 8C:
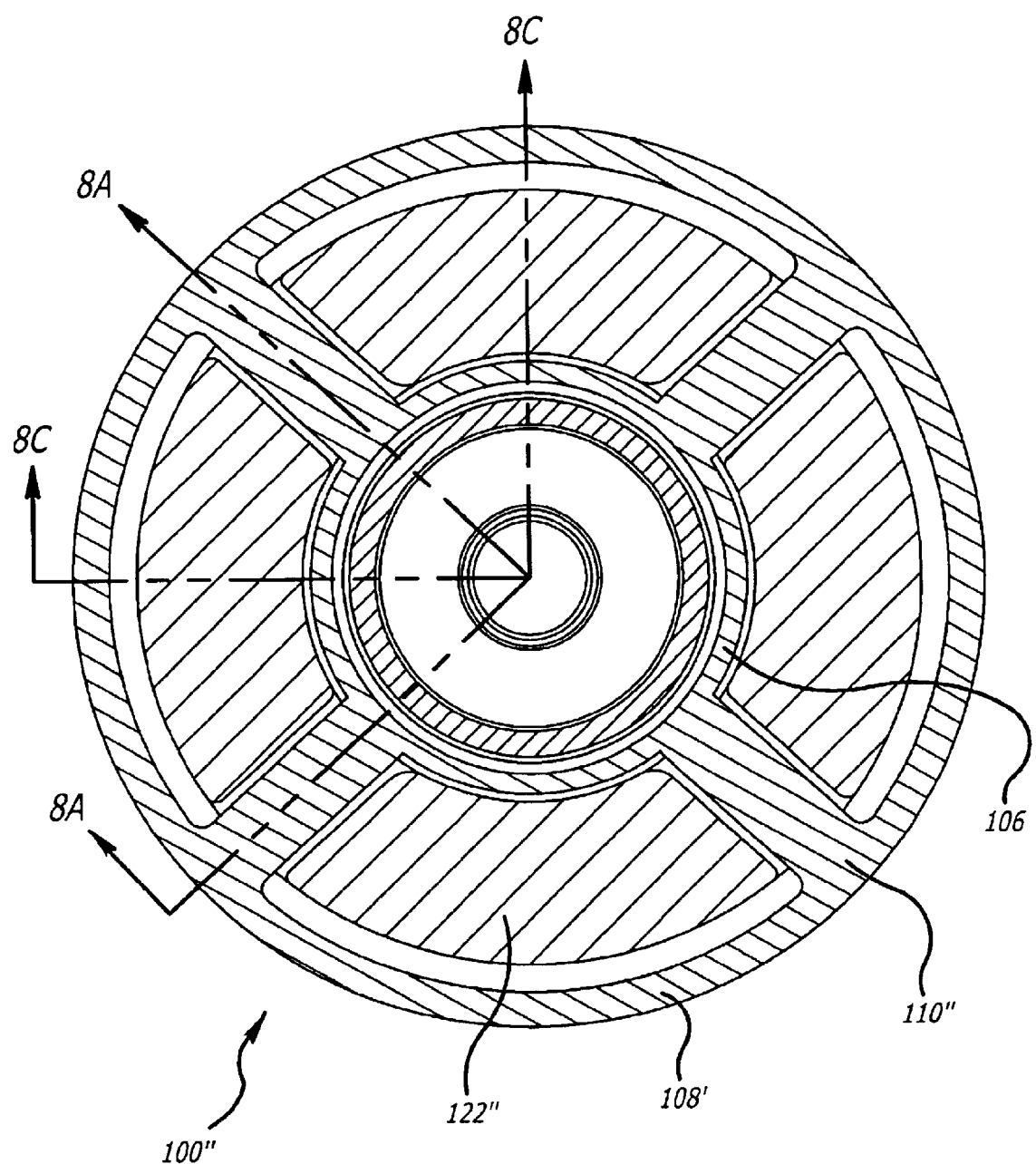
FIG. 8C is a cross-sectional view of the TRCR along the line 8C—8C in FIG. 8A.
Figure 8D:
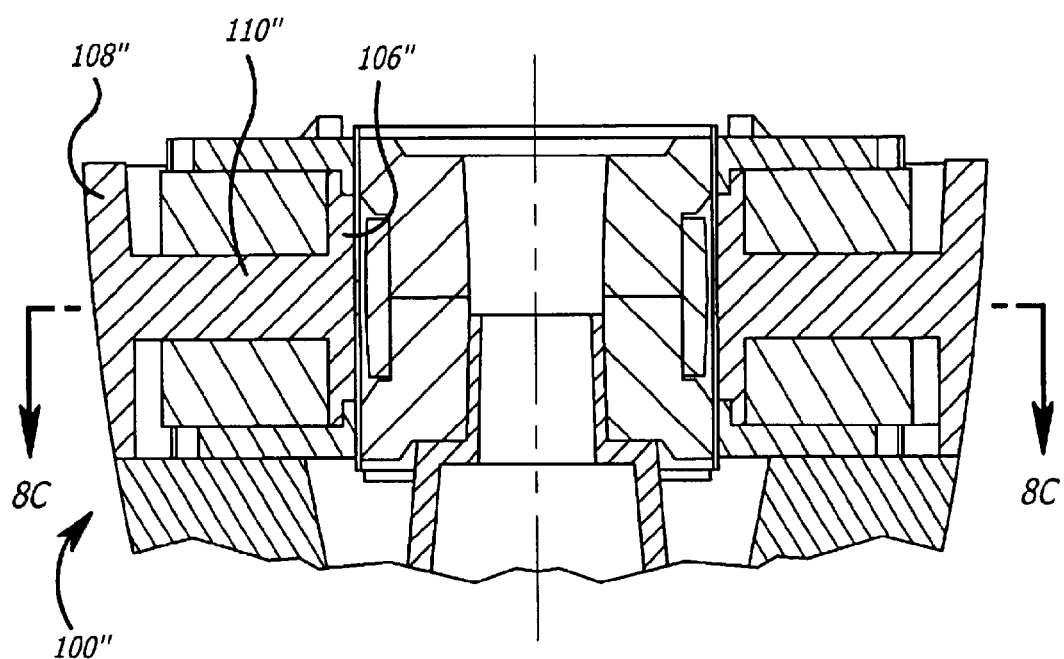

As further illustrated in FIGS. 7D and 7E, the height H'mm of the bridge 110' may have the same height as the middle magnet 122" so that the upper and lower magnets 122', 122''' are substantially in contact with the bridge 110' along the top surface 130 and the bottom surface 126 of the bridge 110'. This way, the magnetic field strength in the magnetic gap 31 can be maintained at minimal loss due to the inclusion of the TRCR 100' within the magnet assembly 122. With regard to material, the TRCR 100' may be made of any material high in thermal and electrical conductivity; i.e. aluminum or copper.

FIGS. 8A–8D illustrate by way of example a TRCR 100" that is substantially similar to the TRCR 100 in FIGS. 7A–7C, except that the outer ring 108' extends outwardly to form the wall of the housing 28. One of the advantages with this embodiment is that heat from the intermediate gar 37, and magnetic gap 31 is directly transferred from the inner ring 106, through the bridge 110", and then to the outer ring 108' and radiates to the atmosphere. This way, the heat is more efficiently conducted away from the intermediate gap 37 and magnetic gap 31.

Figure 9A:
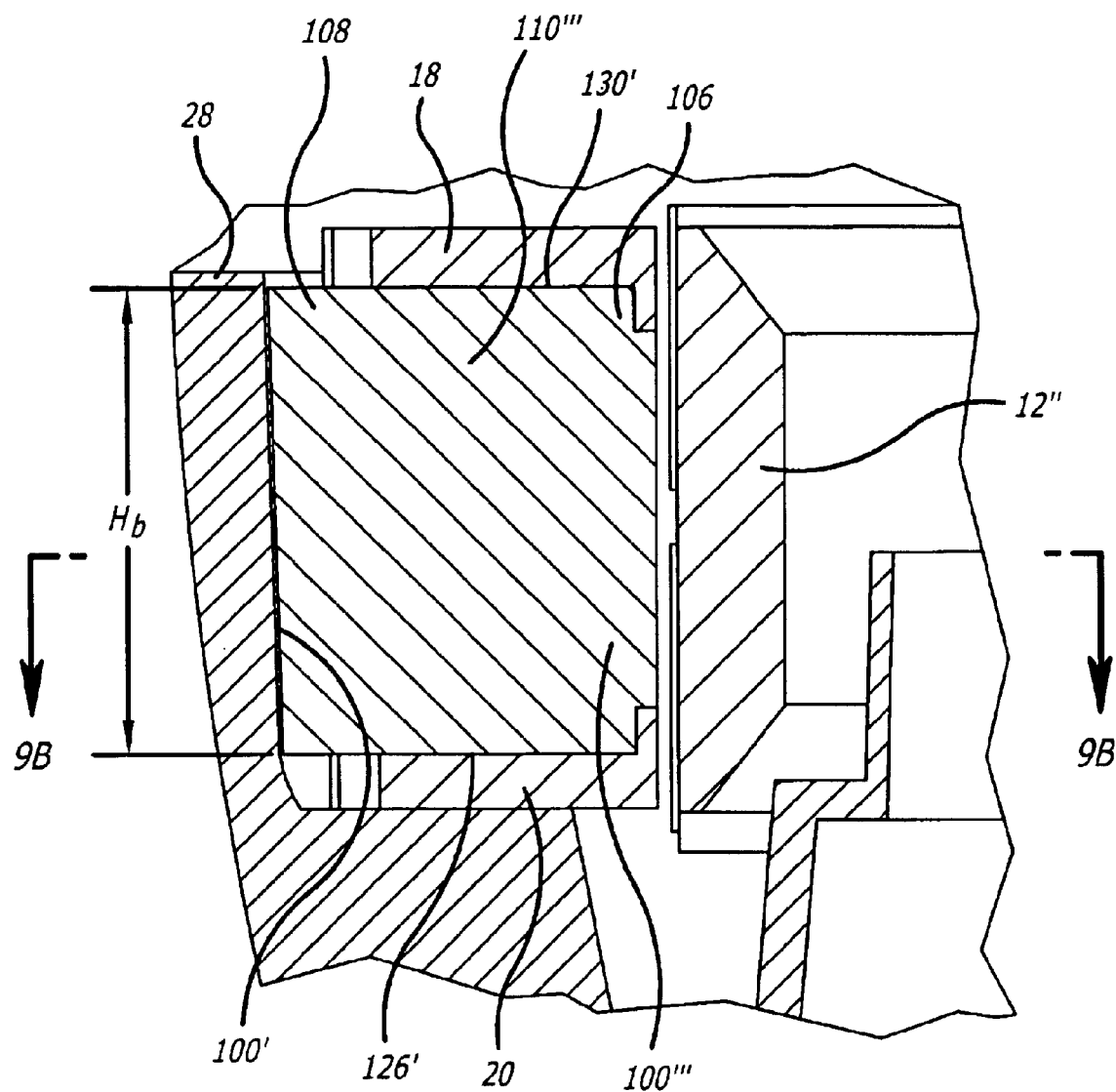
FIG. 9A is a cross-sectional view of yet another alternative embodiment of a TRCR along the line 9A—9A in FIG. 9B below.
Figure 9B:
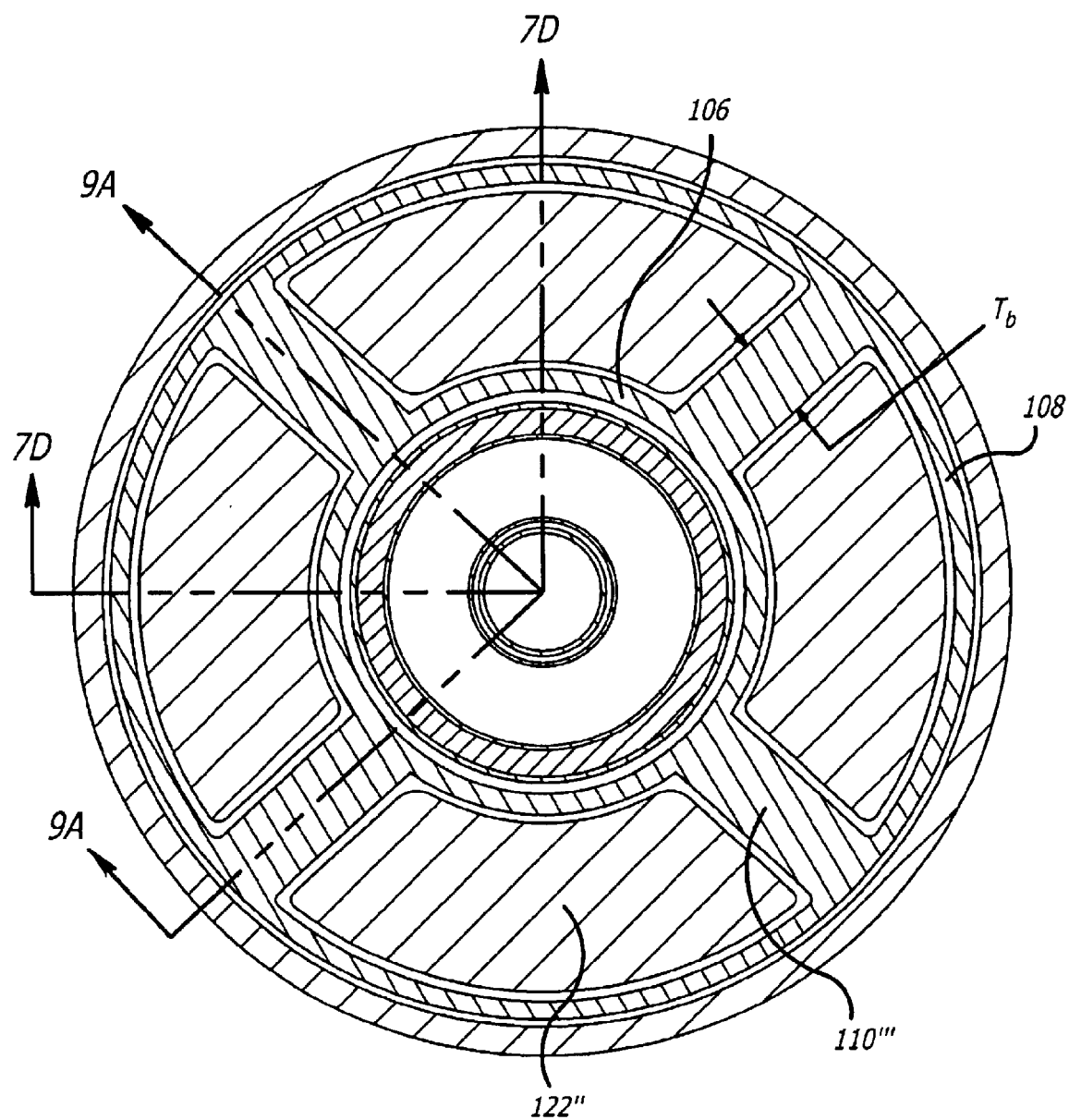
FIG. 9B is a cross-sectional view of the TRCR along the line 9B—9B in FIG. 9A.

FIGS. 9A and 9B illustrate by way of example a TRCR 100''' that is yet another embodiment of the present invention. As shown in FIG. 9A, in this embodiment the height "Hb" of the bridge 110''' may be substantially the same as the height of the inner and outer rings 106, 108. In other words, the top surface 130' of the bridge 110''' may contact the top plate 18, and the bottom surface 126' may contact the bottom plate 20. Moreover, as shown in FIG. 9B, with the four bridges 110''', the four separate magnet assemblies 122 are disposed into four separate openings 102' separated by the bridges 110'''. With this embodiment, the TRCR 100''' may be manufactured by an extrusion process to reduce the cost of manufacturing. Moreover, the increase in the height "Hb" of the bridge 110''' increases the conductive cross-sectional area to transfer heat away from inner ring 106 and to the outer ring 108. This way, the thickness Th of the bridge 110''' may be reduced to increase the size of the magnet assembly 122 to compensate for the loss of magnetic material taken up by the increased height "Hb" material.

As illustrated by the above embodiments, the height "Hb" of the bridge may vary between a small fraction and full height of the inner and outer rings. Moreover, the return With the TRCR, other forms of magnetic materials may be used to fill the openings 102, such as Bonded permanent magnet material. Bonded magnets are made by mixing a base magnetic material, such as ceramic, Neodymium, or Alnico, with an appropriate binder, such as Nylon, Nitrile, Polyethylene, or Thermoplastics, so that the mixture is formed; and the mixture may be Injection Molded or Extruded, into a final product.

Although the present invention has been described in terms of the preferred embodiment above, numerous modifications and/or additions to the above-described preferred embodiments would be readily apparent to one skilled in the art. With respect to the claims, it is applicant's intention that the claims not be interpreted in accordance with the sixth paragraph of 35 U.S.C. § 112 unless the term "means" is used followed by a functional statement.

What is claimed is:

1. A loudspeaker with an improved flux path, comprising:
   a flux return assembly including:
   an upper pole piece;
   a lower pole piece;
   a flux stabilization ring around the upper and lower pole pieces to hold the upper and lower pole pieces substantially together;
   a top plate;
   a bottom plate;
   a magnet in between the top and bottom plates;
   a top magnetic gap between the flux return assembly and the top plate; and
   a bottom magnetic gap between the flux return assembly and the bottom plate.

2. An electromagnetic drive motor according to claim 1, wherein the flux return assembly is within the top and bottom plates, the flux return assembly having a hole along a centerline.

3. An electromagnetic drive motor according to claim 1, wherein the top and bottom plates are within the flux return assembly.

4. An electromagnetic drive motor according to claim 2, wherein both the upper and lower pole pieces have an exterior side and an inner side, the inner sides of both the upper and lower pole pieces juxtaposed to each other, wherein the combined upper and lower pole pieces assembly define an outer wall and an inner wall of the flux return assembly, wherein the flux return assembly has a smaller outer diameter along the inner side than the exterior side defining a recess about the inner side of the flux return assembly.

5. An electromagnetic drive motor according to claim 4, wherein the flux stabilization ring has a smaller inner diameter than the outer diameter of the flux return assembly along the inner side, wherein the flux stabilization ring wraps around the recess of the flux return assembly.

6. An electromagnetic drive motor according to claim 2, further including:
   a first voice coil;
   a second voice coil;
   a cylinder, the first and second coils wound around the cylinder; and
   wherein the cylinder is disposed in the top and bottom magnetic gaps.

7. An electromagnetic drive motor according to claim 6, wherein the first voice coil is juxtaposed to the top plate and the second voice coil is juxtaposed to the bottom plate.

8. An electromagnetic drive motor according to claim 6, wherein the first and second coils are coupled to each other externally from the cylinder and to a pair of terminals.

9. An electromagnetic drive motor according to claim 2, wherein the top plate has a top plate tip juxtaposed to the upper pole piece facing towards the bottom plate, and the bottom plate has a bottom plate tip juxtaposed to the lower pole piece facing towards the top plate.

10. An electromagnetic drive motor according to claim 2, wherein the top plate has a top plate tip juxtaposed to the upper pole piece facing away from the bottom plate, and the bottom plate has a bottom plate tip juxtaposed to the lower pole piece facing away from the top plate.

11. An electromagnetic drive motor according to claim 2, wherein the top plate has a top plate tip juxtaposed to the upper pole piece that faces towards and away from the bottom plate, and the bottom plate has a bottom plate tip juxtaposed to the lower pole piece that faces towards and away from the top plate.

12. An electromagnetic drive motor according to claim 9, wherein the top and bottom plates each have a cavity near the top plate tip and bottom plate tip, respectively.

13. An electromagnetic drive motor according to claim 2, wherein the upper pole piece has a upper pole tip juxtaposed to the top plate, and the bottom pole piece has a lower pole tip juxtaposed to the bottom plate.

14. An electromagnetic drive motor according to claim 2, wherein the upper and lower pole pieces are symmetrical.

15. An electromagnetic drive motor according to claim 2, further includes an intermediate gap between the top and bottom magnetic gaps, an outer flux stabilization ring in between the magnet and the flux stabilization ring, wherein the intermediate gap is between the outer flux stabilization ring and the flux stabilization ring.

16. An electromagnetic drive motor according to claim 2, wherein the flux stabilization ring is made of aluminum.

17. An electromagnetic drive motor according to claim 2, wherein the electromagnetic drive motor is enclosed in a housing.

18. An electromagnetic drive motor according to claim 2, wherein the magnet is an assembly of three layers of magnets.

19. An electromagnetic drive motor according to claim 1, wherein the top plate has an increased saturation area where the cross-sectional area is smaller than the rest of the top plate juxtaposed to the top magnetic gap, wherein the saturation area has a maximum level of magnetic field strength from about 10,000 Gauss to about 22,000 Gauss.

20. An electromagnetic drive motor according to claim 1, wherein the upper pole piece has an increased saturation area where the cross-sectional area is smaller than the rest of the upper pole piece juxtaposed to the top magnetic gap, wherein the saturation area of the upper pole piece has a maximum level of magnetic field strength from about 10,000 Gauss to about 22,000 Gauss.

21. An electromagnetic drive motor, comprising:
    a flux return;
    a top plate;
    a bottom plate;
    a magnet in between the top and bottom plates;
    a top magnetic gap between the flux return and the top plate; and
    a bottom magnetic gap between the flux return and the bottom plate, wherein the flux return has an upper pole tip expanding towards the top magnetic gap and a lower pole tip expanding towards the bottom magnetic gap.

22. An electromagnetic drive motor according to claim 21, wherein the flux return is within the top and bottom plates.

23. An electromagnetic drive motor according to claim 21, wherein the top and bottom plates are within the flux return.

24. An electromagnetic drive motor according to claim 21, wherein the top plate near the top magnetic gap is saturated to a maximum level of magnetic field strength from about 10,000 Gauss to about 22,000 Gauss.

25. An electromagnetic drive motor according to claim 21, wherein the top and bottom plates near the corresponding magnetic gaps are saturated to a maximum level of magnetic field strength from about 10,000 Gauss to about 22,000 Gauss.

26. An electromagnetic drive motor according to claim 21, wherein the flux return near the top and bottom magnetic gaps are saturated to a maximum level of magnetic field strength from about 10,000 Gauss to about 22,000 Gauss.

27. An electromagnetic drive motor according to claim 21, wherein the electromagnetic drive motor has a centerline, wherein along the centerline is a hole.

28. The electromagnetic drive motor according to claim 21, where the enlarged surface in the upper and lower pole tips are substantially parallel to the longitudinal axis of the magnetic gap.

29. A method for forming an inner flux return, comprising the steps of:
    providing an upper pole piece configured to be a ring, the upper pole piece having an exterior side, an inner side, an outer wall, and an inner wall, the diameter of the outer wall along the inner side being smaller than the diameter along the exterior side;
    providing a lower pole piece substantially similar to the upper pole piece;
    providing a flux stabilization ring between the upper and lower pole pieces, wherein the inner diameter of the flux stabilization ring is smaller than the diameter of the outer wall along the inner side of the pole pieces; and
    pressing the inner side of the upper pole piece to the inner side of the lower pole piece, wherein the flux stabilization ring holds the upper and lower pole pieces substantially together.

30. A method according to claim 29, further including the steps of:
    laying a layer of adhesive between the inner sides of the upper and lower pole pieces.

31. A method according to claim 29, further including the steps of:
    saturating the upper and lower pole pieces near the exterior sides and the outer walls of the upper and lower pole pieces.

32. A method according to claim 29, further including the steps of:
    laying a layer of adhesive between the inner side of the flux stabilization ring and outer diameter along the inner sides of the upper and lower pole pieces.

33. A method according to claim 31, wherein the saturation of the magnetic field strength is from about 10,000 Gauss to about 22,000 Gauss.

34. A method for minimizing the modulation in the magnetic gap of an electromagnetic drive motor, comprising the steps of:
    saturating a top plate near a top magnetic gap;
    saturating a bottom plate near a bottom magnetic gap;
    providing a magnet between the top and bottom plates;
    providing a flux return, wherein the top and bottom magnetic gaps are between the flux return and the top and bottom plates; and
    enlarging the surface area in the top and bottom plates juxtaposed to the top and bottom magnetic gaps, respectively, compared to the top and bottom plates away from the magnetic gaps.

35. A method according to claim 34, further including the steps of:
    saturating the flux return near the top and bottom magnetic gaps.

36. A method according to claim 35, wherein the flux return is within the top and bottom plates.

37. A method according to claim 34, further including the steps of:
    using finite element analysis to design the top and bottom plates to operate below the saturation point based on a predetermined flux lines running through the top and bottom plates.

38. A method according to claim 34, further including the steps of:
    saturating the top and bottom plates to a maximum level of magnetic field strength from about 10,000 Gauss to about 22,000 Gauss.

39. A method according to claim 38, wherein the maximum level of magnetic field strength is from about 17,000 Gauss to about 20,000 Gauss.

40. A method according to claim 34, further including the steps of:
saturating the flux return near the top and bottom magnetic gaps to a maximum level of magnetic field strength from about 10,000 Gauss to about 22,000 Gauss.

41. A method according to claim 34, wherein the saturation of the top plate is done by providing a smaller cross-sectional area to squeeze the magnetic field in the smaller cross-sectional area in the top plate adjacent to the top magnetic gap; and
saturation of the bottom plates is done by providing a smaller cross-sectional area to squeeze the magnetic field in the smaller cross-sectional area in the bottom plate adjacent to the bottom magnetic gap.

42. A method according to claim 39, wherein the saturation of the flux return near the top and bottom magnetic gaps are done by providing smaller cross-sectional areas near the top and bottom magnetic gaps respectively to squeeze the magnetic field through the smaller cross-sectional areas near the top and bottom magnetic gaps.

43. The method according to claim 34, where the surface area in the top and bottom plates are substantially parallel to the longitudinal axis of the magnetic gap.

44. A method for increasing the magnetic flux lines running through a magnetic gap of an electromagnetic drive motor, comprising the steps of:
providing a top and bottom plates juxtaposed to respective top and bottom magnetic gaps within an electromagnetic drive motor;
providing a magnet between the top and bottom plates;
providing more surface area in the top plate juxtaposed to the top magnetic gap than away from the ton magnetic gap; and
providing more surface area in the bottom plate juxtaposed to the bottom magnetic gap than away from the bottom magnetic gap.

45. A method according to claim 44, further comprising the steps of:
providing a flux return, wherein the top and bottom magnetic gaps are between the flux return and the top and bottom plates.
providing more surface area in the flux return juxtaposed to the top and bottom magnetic gaps.

46. A method according to claim 44, wherein more surface area is provided in the top plate by a top plate tip and more surface area is provided in the bottom plate by a bottom plate tip, wherein the top and bottom plate tips face towards each other.

47. A method according to claim 46, wherein between the top and bottom magnetic gap is an intermediate gap, wherein the top and bottom plate tip substantially extends across the intermediate area but not so much that a magnetic short circuit is created between the top and bottom plate tips.

48. The method according to claim 44, where the surface area in the top and bottom plates are substantially parallel to the longitudinal axis of the magnetic gap.

49. An electromagnetic drive motor with an improved flux path, comprising:
a flux return;
a top plate;
a bottom plate;
a magnet in between the top and bottom plates;
a top magnetic gap between the flux return and the top plate; and
a bottom magnetic gap between the flux return assembly and the bottom plate, wherein the top plate has a top plate tip juxtaposed to the top magnetic gap facing away from the bottom plate, and the bottom plate has a bottom plate tip juxtaposed to the bottom magnetic gap facing away from the top plate.

50. An electromagnetic drive motor, comprising:
a flux return;
a top plate having a top extended plate tip with an enlarged surface adjacent to the flux return compared to the top plate away from the flux return, where between the top extended plate tip and the flux return is a top magnetic gap;
a bottom plate having a bottom extended plate tip with an enlarged surface adjacent to the flux return compared to the bottom plate away from the flux return, where between the bottom extended plate tip and the flux return is a bottom magnetic gap; and
a magnet between the top and bottom plates.

51. The electromagnetic drive motor of claim 50, further including a magnet in between the top and bottom plates.

52. The electromagnetic drive motor of claim 50, where the flux return has an upper pole tip juxtaposed to the top extended plate tip and a lower pole tip juxtaposed to the bottom extended plate tip.

53. The electromagnetic drive motor of claim 52, where the flux return has saturation regions adjacent to the upper and lower pole tips.

54. A method for coupling an upper pole piece and a lower pole piece each having a recess wall to form a flux return assembly, the method comprising:
fitting the upper and lower pole pieces into a ring to hold the upper and lower pole pieces substantially together by press fitting the recess outer wall for each of the upper and lower pole pieces into the ring.

55. The method according to claim 54, where the step of fitting is done by press fitting the upper and lower pole pieces into the ring.

56. The method according to claim 54, where the ring is flush within the recess outer walls of the upper and lower pole pieces.

* * * * *